United States Patent
Henderson et al.

(10) Patent No.: US 6,195,717 B1
(45) Date of Patent: Feb. 27, 2001

(54) METHOD OF EXPANDING BUS LOADING CAPACITY

(75) Inventors: Michael G. Henderson, San Jose; Carlton G. Amdahl; Dennis H. Smith, both of Fremont; Don Agneta, Morgan Hill, all of CA (US)

(73) Assignee: Micron Electronics, Inc., Nampa, ID (US)

( * ) Notice: Subject to any disclaimer, the term of this patent is extended or adjusted under 35 U.S.C. 154(b) by 0 days.

(21) Appl. No.: 08/942,223

(22) Filed: Oct. 1, 1997

Related U.S. Application Data

(60) Provisional application No. 60/047,016, filed on May 13, 1997, provisional application No. 60/046,416, filed on May 13, 1997, provisional application No. 60/047,003, filed on May 13, 1997, provisional application No. 60/046,490, filed on May 13, 1997, provisional application No. 60/046,398, filed on May 13, 1997, and provisional application No. 60/046,312, filed on May 13, 1997.

(51) Int. Cl.[7] .............................. G06F 13/00; G06F 13/40
(52) U.S. Cl. ............................... 710/101; 710/8; 710/10; 713/1; 713/2
(58) Field of Search ............................... 395/182.04, 821, 395/830, 281, 652, 651, 828; 710/101, 8, 10; 713/1, 2

(56) References Cited

U.S. PATENT DOCUMENTS

| | | | |
|---|---|---|---|
| 4,057,847 | 11/1977 | Lowell et al. | 364/200 |
| 4,100,597 | 7/1978 | Fleming et al. | 364/474 |
| 4,449,182 | 5/1984 | Rubinson et al. | 364/200 |
| 4,672,535 | 6/1987 | Katzman et al. | 364/200 |
| 4,692,918 | 9/1987 | Elliott et al. | 370/85 |
| 4,695,946 | 9/1987 | Andreasen et al. | 364/200 |
| 4,707,803 | 11/1987 | Anthony, Jr. et al. | 364/900 |

(List continued on next page.)

FOREIGN PATENT DOCUMENTS

| | | | |
|---|---|---|---|
| 0 866 403 A1 | 9/1998 | (EP) | G06F/13/10 |
| 04 333 118 | 11/1992 | (JP) | G06F/1/18 |
| 05 233 110 | 9/1993 | (JP) | G06F/3/00 |
| 07 093 064 | 4/1995 | (JP) | G06F/1/26 |
| 07 261 874 | 10/1995 | (JP) | G06F/1/18 |

OTHER PUBLICATIONS

Standard Overview, http://www.pc–card.com/stand_overview.html#1, 9 pages, Jun. 1990, "Detailed Overview of the PC Card Standard."

Digital Equipment Corporation, datasheet, 140 pages, 1993, "DECchip 21050 PCI–TO–PCI Bridge."

NetFRAME Systems Incorporated, News Release, 3 pages, referring to May 9, 1994, "NetFRAME's New High–Availability ClusterServer Systems Avoid Scheduled as well as Unscheduled Downtime."

Compaq Computer Corporation, Phenix Technologies, LTD, and Intel Corporation, specification, 55 pages, May 5, 1995, "Plug & Play BIOS Specification."*

(List continued on next page.)

Primary Examiner—Thomas C. Lee
Assistant Examiner—Rehana Perveen
(74) Attorney, Agent, or Firm—Knobbe, Martens, Olson & Bear LLP

(57) ABSTRACT

A method for expanding the loading capacity of a PCI bus in an information processing system having a multiple bus architecture. In one embodiment, the method comprises connecting a processor-to-PCI bridge to a plurality of PCI-to-PCI bridges to generate multiple PCI buses. A plurality of add-in board connectors are coupled to each of the generated PCI buses. In another embodiment, the method comprises connecting two or more processor-to-PCI bridges to a plurality of PCI-to-PCI bridges to generate multiple PCI buses. The resulting system expands the loading capacity of a PCI bus while adding fault-tolerance and resistance to single point failures.

30 Claims, 3 Drawing Sheets

U.S. PATENT DOCUMENTS

| | | | |
|---|---|---|---|
| 4,769,764 | 9/1988 | Levanon | 364/708 |
| 4,774,502 | 9/1988 | Kimura | 340/501 |
| 4,821,180 | 4/1989 | Gerety et al. | 364/200 |
| 4,835,737 | 5/1989 | Herrig et al. | 364/900 |
| 4,894,792 | 1/1990 | Mitchell et al. | 364/708 |
| 4,949,245 | 8/1990 | Martin et al. | 364/200 |
| 4,999,787 | 3/1991 | McNally et al. | 364/514 |
| 5,006,961 | 4/1991 | Monico | 361/413 |
| 5,007,431 | 4/1991 | Donehoo, III | 128/696 |
| 5,033,048 | 7/1991 | Pierce et al. | 371/21.2 |
| 5,051,720 | 9/1991 | Kittirutsunetorn | 340/310 R |
| 5,073,932 | 12/1991 | Yossifor et al. | 380/23 |
| 5,103,391 | 4/1992 | Barrett | 364/133 |
| 5,118,970 | 6/1992 | Olson et al. | 307/443 |
| 5,121,500 | 6/1992 | Arlington et al. | 395/750 |
| 5,123,017 * | 6/1992 | Simpkins et al. | 371/15.1 |
| 5,136,708 | 8/1992 | Lapourtre et al. | 395/650 |
| 5,136,715 | 8/1992 | Hirose et al. | 395/775 |
| 5,138,619 | 8/1992 | Fasang et al. | 371/21.1 |
| 5,157,663 | 10/1992 | Major et al. | 371/9.1 |
| 5,210,855 * | 5/1993 | Bartol | 395/500 |
| 5,245,615 | 9/1993 | Treu | 371/16.5 |
| 5,247,683 | 9/1993 | Holmes et al. | 395/700 |
| 5,253,348 | 10/1993 | Scalise | 395/325 |
| 5,261,094 * | 11/1993 | Everson et al. | 395/600 |
| 5,265,098 | 11/1993 | Mattson et al. | 371/11.1 |
| 5,266,838 | 11/1993 | Gerner | 307/19 |
| 5,269,011 | 12/1993 | Yanai et al. | 395/425 |
| 5,272,382 | 12/1993 | Heald et al. | 307/66 |
| 5,272,584 * | 12/1993 | Austruy et al. | 631/58 |
| 5,276,863 | 1/1994 | Heider | 395/575 |
| 5,277,615 | 1/1994 | Hastings et al. | 439/377 |
| 5,280,621 | 1/1994 | Barnes et al. | 395/800 |
| 5,283,905 | 2/1994 | Saadeh et al. | 395/750 |
| 5,307,354 | 4/1994 | Cramer et al. | 371/11.2 |
| 5,311,397 | 5/1994 | Harshberger et al. | 361/683 |
| 5,311,451 | 5/1994 | Barrett | 364/550 |
| 5,317,693 | 5/1994 | Cuenod et al. | 395/275 |
| 5,329,625 | 7/1994 | Kannan et al. | 395/275 |
| 5,337,413 * | 8/1994 | Liu et al. | 395/275 |
| 5,351,276 | 9/1994 | Doll, Jr. et al. | 379/67 |
| 5,367,670 | 11/1994 | Ward et al. | 395/575 |
| 5,379,184 | 1/1995 | Barraza et al. | 361/685 |
| 5,379,409 * | 1/1995 | Ishikawa | 395/575 |
| 5,386,567 | 1/1995 | Lien et al. | 395/700 |
| 5,388,267 | 2/1995 | Chan et al. | 395/700 |
| 5,402,431 | 3/1995 | Saadeh et al. | 371/67.1 |
| 5,404,494 | 4/1995 | Garney | 395/500 |
| 5,423,025 | 6/1995 | Goldman et al. | 395/575 |
| 5,430,717 | 7/1995 | Fowler et al. | 370/58.2 |
| 5,430,845 | 7/1995 | Rimmer et al. | 395/275 |
| 5,432,715 | 7/1995 | Shigematsu et al. | 364/551.01 |
| 5,432,946 | 7/1995 | Allard et al. | 395/750 |
| 5,438,678 | 8/1995 | Smith | 395/750 |
| 5,440,748 | 8/1995 | Sekine et al. | 395/750 |
| 5,448,723 | 9/1995 | Rowett | 395/200.02 |
| 5,455,933 | 10/1995 | Schieve et al. | 395/183.03 |
| 5,460,441 | 10/1995 | Hastings et al. | 312/298 |
| 5,463,766 | 10/1995 | Schieve et al. | 395/650 |
| 5,471,617 * | 11/1995 | Farrand et al. | 395/700 |
| 5,471,634 | 11/1995 | Giorgio et al. | 395/600 |
| 5,473,499 | 12/1995 | Weir | 361/58 |
| 5,483,419 | 1/1996 | Kaczeus, Sr. et al. | 361/685 |
| 5,485,550 | 1/1996 | Dalton | 395/51 |
| 5,485,607 * | 1/1996 | Lomet et al. | 395/600 |
| 5,487,148 | 1/1996 | Komori et al. | 395/182.02 |
| 5,491,791 | 2/1996 | Glowny et al. | 395/183.13 |
| 5,493,574 | 2/1996 | McKinley | 371/40.1 |
| 5,493,666 | 2/1996 | Fitch | 395/445 |
| 5,510,855 | 5/1993 | Bartol | 395/500 |
| 5,513,314 | 4/1996 | Kandasamy et al. | 395/182.04 |
| 5,513,339 | 4/1996 | Agrawal et al. | 395/500 |
| 5,517,646 | 5/1996 | Piccirillo et al. | 395/700 |
| 5,519,851 | 5/1996 | Bender et al. | 395/500 |
| 5,526,289 | 6/1996 | Dinh et al. | 364/557 |
| 5,528,409 | 6/1996 | Cucci et al. | 359/171 |
| 5,530,810 | 6/1996 | Bowman | 395/283 |
| 5,533,193 | 7/1996 | Roscoe | 395/183.15 |
| 5,535,326 | 7/1996 | Baskey et al. | 395/182.02 |
| 5,539,883 * | 7/1996 | Allon et al. | 395/200.11 |
| 5,542,055 * | 7/1996 | Amini et al. | 395/281 |
| 5,546,272 | 8/1996 | Moss et al. | 361/687 |
| 5,548,712 | 8/1996 | Larson et al. | 395/182.05 |
| 5,553,198 * | 7/1996 | Thorson | 395/200.15 |
| 5,555,510 | 9/1996 | Verseput et al. | 364/514 R |
| 5,559,764 | 9/1996 | Chen et al. | 396/30 |
| 5,559,958 | 9/1996 | Farrand et al. | 395/183.03 |
| 5,559,965 | 9/1996 | Oztaskin et al. | 395/284 |
| 5,560,022 | 9/1996 | Dunstan et al. | 395/750 |
| 5,564,024 * | 10/1996 | Pemberton | 395/283 |
| 5,566,299 | 10/1996 | Billings et al. | 395/182.02 |
| 5,566,339 | 10/1996 | Perholtz et al. | 395/750 |
| 5,568,610 | 10/1996 | Brown | 395/185.01 |
| 5,568,619 | 10/1996 | Blackledge et al. | 395/281 |
| 5,572,403 | 11/1996 | Mills | 361/695 |
| 5,577,205 | 11/1996 | Hwang et al. | 395/200.01 |
| 5,579,487 | 11/1996 | Meyerson et al. | 395/280 |
| 5,579,491 * | 11/1996 | Jeffries et al. | 395/283 |
| 5,579,528 | 11/1996 | Register | 395/671 |
| 5,581,712 | 12/1996 | Herrman | 395/283 |
| 5,581,714 | 12/1996 | Amini et al. | 395/308 |
| 5,584,030 | 12/1996 | Husak et al. | 395/750 |
| 5,586,250 | 12/1996 | Carbonneau et al. | 395/183.2 |
| 5,588,121 | 12/1996 | Reddin et al. | 395/200.15 |
| 5,588,144 | 12/1996 | Inoue et al. | 395/555 |
| 5,592,610 * | 1/1997 | Chittor | 395/182.02 |
| 5,592,611 | 1/1997 | Midgely et al. | 395/182.02 |
| 5,596,711 | 1/1997 | Burckhartt et al. | 395/182.21 |
| 5,598,407 | 1/1997 | Bud et al. | 370/330 |
| 5,602,758 | 2/1997 | Lincoln et al. | 364/505 |
| 5,604,873 * | 2/1997 | Fite et al. | 395/283 |
| 5,606,672 | 2/1997 | Wade | 395/308 |
| 5,608,876 * | 3/1997 | Cohen et al. | 395/281 |
| 5,615,207 | 3/1997 | Gephardt et al. | 370/237 |
| 5,621,159 | 4/1997 | Brown et al. | 73/9 |
| 5,621,892 * | 4/1997 | Cook | 395/200.1 |
| 5,622,221 | 4/1997 | Genga, Jr. et al. | 165/208 |
| 5,625,238 | 4/1997 | Ady et al. | 307/147 |
| 5,627,962 | 5/1997 | Goodrum et al. | 395/182.11 |
| 5,628,028 | 5/1997 | Michelson | 395/825 |
| 5,630,076 | 5/1997 | Saulpaugh et al. | 395/284 |
| 5,631,847 | 5/1997 | Kikinis | 364/514 R |
| 5,632,021 * | 5/1997 | Jennings et al. | 395/309 |
| 5,636,341 | 6/1997 | Matsushita et al. | 395/182.11 |
| 5,638,289 * | 6/1997 | Yamada et al. | 364/489 |
| 5,644,470 | 7/1997 | Benedict et al. | 361/686 |
| 5,644,731 * | 7/1997 | Liencres et al. | 395/283 |
| 5,651,006 | 7/1997 | Fujino et al. | 370/408 |
| 5,652,832 | 7/1997 | Kane et al. | 395/181 |
| 5,652,839 | 7/1997 | Giorgio et al. | 395/200.11 |
| 5,652,892 | 7/1997 | Ugajin | 395/750 |
| 5,652,908 | 7/1997 | Douglas et al. | 395/800 |
| 5,655,081 | 8/1997 | Bonnell et al. | 395/200.32 |
| 5,655,083 | 8/1997 | Bagley | 395/182.31 |
| 5,655,148 | 8/1997 | Richman et al. | 395/828 |
| 5,659,682 | 8/1997 | Devarakonda et al. | 395/184.01 |
| 5,664,118 | 9/1997 | Nishigaki et al. | 395/283 |
| 5,664,119 | 9/1997 | Jeffries et al. | 395/283 |
| 5,666,538 | 9/1997 | DeNicola | 395/750.03 |
| 5,668,943 | 9/1997 | Attanasio et al. | 395/182.05 |
| 5,668,992 | 9/1997 | Hammer et al. | 395/651 |

| | | | | | | | |
|---|---|---|---|---|---|---|---|
| 5,669,009 | 9/1997 | Buktenica et al. | 395/800.35 | 5,801,921 | 9/1998 | Miller | 361/686 |
| 5,671,371 | 9/1997 | Kondo et al. | 395/306 | 5,802,269 | 9/1998 | Poisner et al. | 395/183.2 |
| 5,675,723 | 10/1997 | Ekrot et al. | 395/182.02 | 5,802,298 | 9/1998 | Imai et al. | 395/200.47 |
| 5,680,288 | 10/1997 | Carey et al. | 361/118 | 5,802,305 | 9/1998 | McKaughan et al. | 395/200.57 |
| 5,684,671 | 11/1997 | Hobbs et al. | 361/683 | 5,802,324 | 9/1998 | Wunderlich et al. | 395/281 |
| 5,689,637 | 11/1997 | Johnson et al. | 395/183.22 | 5,802,393 | 9/1998 | Begun et al. | 395/830 |
| 5,696,895 | 12/1997 | Hemphill et al. | 395/182.02 | 5,802,552 | 9/1998 | Fandrich et al. | 711/103 |
| 5,696,899 | 12/1997 | Kalwitz | 395/200.1 | 5,802,592 | 9/1998 | Chess et al. | 711/164 |
| 5,696,949 | 12/1997 | Young | 395/551 | 5,803,357 | 9/1998 | Lakin | 236/78 B |
| 5,696,970 | 12/1997 | Sandage et al. | 395/681 | 5,805,804 | 9/1998 | Laursen et al. | 395/200.02 |
| 5,701,417 | 12/1997 | Lewis et al. | 395/200.11 | 5,805,834 | 9/1998 | McKinley et al. | 395/283 |
| 5,704,031 | 12/1997 | Mikami et al. | 395/182.02 | 5,809,224 | 9/1998 | Schultz et al. | 395/182.05 |
| 5,708,775 | 1/1998 | Nakamura | 395/185.01 | 5,809,256 | 9/1998 | Najemy | 395/283 |
| 5,708,776 | 1/1998 | Kikinis | 395/185.08 | 5,809,287 | 9/1998 | Stupek, Jr. et al. | 395/500 |
| 5,712,754 | 1/1998 | Sides et al. | 361/58 | 5,809,311 | 9/1998 | Jones | 395/750.01 |
| 5,715,456 | 2/1998 | Bennett et al. | 395/652 | 5,809,555 | 9/1998 | Hobson | 711/172 |
| 5,717,570 | 2/1998 | Kikinis | 361/685 | 5,812,748 | 9/1998 | Ohran et al. | 395/182.02 |
| 5,721,935 | 2/1998 | DeSchepper et al. | 395/750 | 5,812,750 | 9/1998 | Dev et al. | 395/182.02 |
| 5,724,529 | 3/1998 | Smith et al. | 395/309 | 5,812,757 | 9/1998 | Okamoto et al. | 395/182.09 |
| 5,726,506 | 3/1998 | Wood | 307/147 | 5,812,858 | 9/1998 | Nookala et al. | 395/733 |
| 5,727,207 | 3/1998 | Gates et al. | 395/651 | 5,815,117 | 9/1998 | Kolanek | 342/442 |
| 5,732,266 | 3/1998 | Moore et al. | 395/651 | 5,815,647 | 9/1998 | Buckland et al. | 395/182.01 |
| 5,737,708 | 4/1998 | Grob et al. | 455/557 | 5,815,652 | 9/1998 | Ote et al. | 395/183.07 |
| 5,740,378 | 4/1998 | Rehl et al. | 395/283 | 5,821,596 | 10/1998 | Miu et al. | 257/419 |
| 5,742,514 | 4/1998 | Bonola | 364/492 | 5,822,547 | 10/1998 | Boesch et al. | 395/283 |
| 5,742,833 | 4/1998 | Dea et al. | 395/750.05 | 5,826,043 | 10/1998 | Smith et al. | 395/281 |
| 5,747,889 | 5/1998 | Raynham et al. | 307/80 | 5,835,719 | 11/1998 | Gibson et al. | 395/200.51 |
| 5,748,426 | 5/1998 | Bedingfield et al. | 361/58 | 5,835,738 | 11/1998 | Blackledge, Jr. et al. | 395/307 |
| 5,752,164 | 5/1998 | Jones | 455/33.1 | 5,838,932 | 11/1998 | Alzien | 395/308 |
| 5,754,797 | 5/1998 | Takahashi | 395/283 | 5,841,964 | 11/1998 | Yamaguchi | 395/113.21 |
| 5,758,165 | 5/1998 | Shuff | 395/712 | 5,841,991 | 11/1998 | Russell | 395/200.51 |
| 5,758,352 | 5/1998 | Reynolds et al. | 707/200 | 5,845,061 | 12/1998 | Miyamoto et al. | 395/182.02 |
| 5,761,033 | 6/1998 | Wilhelm | 361/686 | 5,845,095 | 12/1998 | Reed et al. | 395/283 |
| 5,761,045 | 6/1998 | Olson et al. | 361/726 | 5,850,546 | 12/1998 | Kim | 395/651 |
| 5,761,085 | 6/1998 | Giorgio | 364/505 | 5,852,720 | 12/1998 | Gready et al. | 395/200.47 |
| 5,761,462 | 6/1998 | Neal et al. | 395/309 | 5,852,724 | 12/1998 | Glenn, II et al. | 395/200.69 |
| 5,761,707 | 6/1998 | Aiken et al. | 711/118 | 5,857,074 | 1/1999 | Johnson | 395/200.47 |
| 5,764,924 | 6/1998 | Hong | 395/281 | 5,857,102 | 1/1999 | McChesney et al. | 395/653 |
| 5,764,968 | 6/1998 | Ninomiya | 395/560 | 5,864,653 | 1/1999 | Tavallaei et al. | 315/181 |
| 5,765,008 | 6/1998 | Desai et al. | 395/800 | 5,864,713 | 1/1999 | Terry | 395/872 |
| 5,765,198 | 6/1998 | McCrocklin et al. | 711/165 | 5,867,730 | 2/1999 | Leyda | 395/830 |
| 5,767,844 | 6/1998 | Stoye | 345/212 | 5,875,307 | 2/1999 | Ma et al. | 395/281 |
| 5,768,541 | 6/1998 | Pan-Ratzlaff | 395/283 | 5,875,308 | 2/1999 | Egan et al. | 395/283 |
| 5,768,542 | 6/1998 | Enstrom et al. | 395/284 | 5,875,310 | 2/1999 | Buckland et al. | 395/306 |
| 5,771,343 | 6/1998 | Hafner et al. | 395/182.02 | 5,878,237 | 3/1999 | Olarig | 395/308 |
| 5,774,645 | 6/1998 | Beaujard et al. | 395/183.01 | 5,878,238 | 3/1999 | Gan et al. | 395/308 |
| 5,774,741 | 6/1998 | Choi | 395/822 | 5,881,311 | 3/1999 | Woods | 395/824 |
| 5,777,897 | 7/1998 | Giorgio | 364/557 | 5,884,027 | 3/1999 | Garbus et al. | 395/200.8 |
| 5,778,197 | 7/1998 | Dunham | 395/284 | 5,884,049 | 6/1999 | Atkinson | 395/281 |
| 5,781,703 | 7/1998 | Desai et al. | 395/54 | 5,886,424 | 3/1999 | Kim | 307/64 |
| 5,781,716 | 7/1998 | Hemphill et al. | 395/182.02 | 5,889,965 | 3/1999 | Wallach et al. | 395/283 |
| 5,781,744 | 7/1998 | Johnson et al. | 395/283 | 5,892,898 | 4/1999 | Fujii et al. | 395/185.1 |
| 5,781,767 | 7/1998 | Inoue et al. | 395/555 | 5,892,928 | 4/1999 | Wallach et al. | 395/283 |
| 5,781,798 | 7/1998 | Beatty et al. | 395/830 | 5,898,846 | 4/1999 | Kelly | 395/284 |
| 5,784,555 | 7/1998 | Stone | 395/200.5 | 5,898,888 | 4/1999 | Guthrie et al. | 395/308 |
| 5,784,576 | 7/1998 | Guthrie et al. | 395/283 | 5,905,867 | 5/1999 | Giorgio | 395/200.54 |
| 5,787,019 | 7/1998 | Knight et al. | 364/550 | 5,907,672 | 5/1999 | Matze et al. | 395/182.06 |
| 5,787,459 | 7/1998 | Stallmo et al. | 711/112 | 5,909,568 | 6/1999 | Nason | 395/500 |
| 5,787,491 | 7/1998 | Merkin et al. | 711/173 | 5,911,779 | 6/1999 | Stallmo et al. | 714/6 |
| 5,790,775 | 8/1998 | Marks et al. | 395/182.07 | 5,913,034 | 6/1999 | Malcolm | 395/200.53 |
| 5,790,831 | 8/1998 | Lin et al. | 395/500 | 5,922,060 | 7/1999 | Goodrum | 710/103 |
| 5,793,948 | 8/1998 | Asahi et al. | 395/184.01 | 5,930,358 | 7/1999 | Rao | 380/4 |
| 5,793,987 | 8/1998 | Quackenbush et al. | 395/280 | 5,935,262 | 8/1999 | Barrett et al. | 714/46 |
| 5,794,035 | 8/1998 | Golub et al. | 395/674 | 5,936,960 | 8/1999 | Stewart | 370/438 |
| 5,796,185 | 8/1998 | Takata et al. | 307/140 | 5,938,751 | 8/1999 | Tavallaei et al. | 710/103 |
| 5,796,580 | 8/1998 | Komatsu et al. | 361/687 | 5,941,996 | 8/1999 | Smith et al. | 714/47 |
| 5,796,981 | 8/1998 | Abudayyeh et al. | 395/500 | 5,964,855 | 10/1999 | Bass et al. | 710/103 |
| 5,797,023 | 8/1998 | Berman et al. | 395/750.06 | 5,983,349 | 11/1999 | Kodama et al. | 713/200 |
| 5,798,828 | 8/1998 | Thomas et al. | 356/141.3 | 5,987,554 | 11/1999 | Liu et al. | 710/129 |
| 5,799,036 | 8/1998 | Staples | 375/222 | 5,987,627 | 11/1999 | Rawlings, III | 714/48 |
| 5,799,196 | 8/1998 | Flannery | 395/750.03 | 6,012,130 | 1/2000 | Beyda et al. | 711/173 |

OTHER PUBLICATIONS

NetFRAME Systems Incorporated, datasheet, 2 pages, Feb. 1996, "NF450FT Network Mainframe."*

NetFRAME Systems Incorporated, datasheet, 9 pages, Mar. 1996, "NetFRAME Cluster Server 8000."*

Joint work by Intel Corporation, Compaq, Adaptec, Hewlett Packard, and Novell, presentation, 22 pages, Jun. 1996, "Intelligent I/O Architecture."

Lockareff, M., HTINews, http://www.hometoys.com/htinews/dec96/articles/Ionworks.htm, 2 pages, Dec. 1996, "Loneworks—An Introduction."

Schofield, M.J., http://www.omegas.co.uk/CAN/canworks.htm, 4 pages, Copyright 1996, 1997, "Controller Area Network—How CAN Works."

NTRR, Ltd, http://www.nrtt.demon.co.uk/cantech.html, 5 pages, May 28, 1997, "CAN: Technical Overview."

Herr, et al., Linear Technology Magazine, Design Features, pp. 21–23, Jun. 1997, "Hot Swapping the PCI Bus."

PCI Special Interest Group, specification, 35 pages, Draft For Review Only, Jun. 15, 1997, "PCI Bus Hot Plug Specification."

Microsoft Corporation, file:///A|/Rem_devs.htm, 4 pages, Copyright 1997, updated Aug. 13, 1997, "Supporting Removable Devices Under Windows and Windows NT."

Shanley and Anderson, PCI System Architecture, Third Edition, Chapters 15 & 16, pp. 297–328, CR 1995.

PCI Hot–Plug Specification, Preliminary Revision for Review Only, Revision 0.9, pp. i–vi, and 1–25, Mar. 5, 1997.

SES SCSI–3 Enclosure Services, X3T10/Project 1212–D/Rev 8a, pp. i, iii–x, 1–76, and I–1 (index), Jan. 16, 1997.

Compaq Computer Corporation, Technology Brief, pp. 1–13, Dec. 1996, "Where Do I Plug the Cable? Solving the Logical–Physical Slot Numbering Problem."

Davis, T, Usenet post to alt.msdos.programmer, Apr. 1997, "Re: How do I create an FDISK batch file?".

Davis, T., Usenet post to alt.msdos.batch, Apr. 1997, "Re: Need help with automating FDISK and FORMAT . . . ".

NetFrame Systems Incorporated, Doc. No. 78–1000226–01, pp. 1–2, 5–8, 359–404, and 471–512, Apr. 1996, "NetFrame Clustered Multiprocessing Software: NW0496 DC–ROM for Novell® NetWare® 4.1 SMP, 4.1, and 3.12."

Shanley, and Anderson, PCI System Architecture, Third Edition, Chapter 15, pp. 297–302, Copyright 1995, "Intro To Configuration Address Space."

Shanley, and Anderson, PCI System Architecture, Third Edition, Chapter 16, pp. 303–328, Copyright 1995, "Configuration Transactions."

Sun Microsystems Computer Company, Part No. 802–5355–10, Rev. A, May 1996, "Solstice SyMON User's Guid."

Sun Microsystems, Part No. 802–6569–11, Release 1.0.1, Nov. 1996, "Remote Systems Diagnostics Installation & User Guide."

Gorlick, M., Conf. Proceedings: ACM/ONR Workshop on Parallel and Distributed Debugging, pp. 175–181, 1991, "The Flight Recorder: An Architectural Aid for System Monitoring."

IBM Technical Disclosure Bulliten, 92A+62947, pp. 391–394, Oct. 1992, Method for Card Hot Plug Detection and Control.

Lyons, Computer Reseller News, Issue 721, pp. 61–62, Feb. 3, 1997, "ACC Releases Low–Cost Solution for ISPs."

M2 Communications, M2 Presswire, 2 pages, Dec. 19, 1996, "Novell IntranetWare Supports Hot Pluggable PCI from NetFRAME."

Rigney, PC Magazine, 14(17):375–379, Oct. 10, 1995, "The One for the Road (Mobile–aware capabilities in Windows 95)."

Shanley, and Anderson, PCI System Architecture, Third Edition, p. 382, Copyright 1995.

*ftp.cdrom.com/pub/os2/diskutil/*, PHDX software, phdx.zip download, Mar. 1995, "Parallel Hard Disk Xfer."

Cmasters, Usenet post to microsoft.public.windowsnt.setup, Aug. 1997, "Re: FDISK switches."

Hildebrand, N., Usenet post to comp.msdos.programmer, May 1995, "Re: Structure of disk partition into."

Lewis, L., Usenet post to alt.msdos.batch, Apr. 1997, "Re: Need help with automating FDISK and FORMAT."

Netframe, *http://www.netframe–support.com/technology/datasheets/data.htm*, before Mar. 1997, "Netframe Cluster-System 9008 Data Sheet."

Simos, M., Usenet post to comp.os.msdos.misc, Apr. 1997, "Re: Auto FDISK and FORMAT."

Wood, M. H., Usenet post to comp.os.netware.misc, Aug. 1996, "Re: Workstation duplication method for WIN95."

* cited by examiner

METHOD OF EXPANDING BUS LOADING CAPACITY

RELATED APPLICATIONS

The subject matter of U.S. Patent Application entitled EXPANSION OF PCI BUS LOADING CAPACITY, filed on Oct. 1, 1997, application Ser. No. 08/942,404 (now pending) is related to this application.

PRIORITY CLAIM

The benefit under 35 U.S.C. § 119(e) of the following U.S. provisional application(s) is hereby claimed:

| Title | Application No. | Filing Date |
| --- | --- | --- |
| "Hardware and Software Architecture for Inter-Connecting an Environmental Management System with a Remote Interface" | 60/047,016 | May 13, 1997 |
| "Self Management Protocol for a Fly-By-Wire Service Processor" | 60/046,416 | May 13, 1997 |
| "Isolated Interrupt Structure for Input/Output Architecture" | 60/047,003 | May 13, 1997 |
| "Three Bus Server Architecture with a Legacy PCI Bus and Mirrored I/O PCI Buses" | 60/046,490 | May 13, 1997 |
| "Computer System Hardware Infrastructure for Hot Plugging Single and Multi-Function PC Cards Without Embedded Bridges" | 60/046,398 | May 13, 1997 |
| "Computer System Hardware Infrastructure for Hot Plugging Multi-Function PCI Cards With Embedded Bridges" | 60/046,312 | May 13, 1997 |

APPENDICES

Appendix A, which forms a part of this disclosure, is a list of commonly owned copending U.S. patent applications. Each one of the applications listed in Appendix A is hereby incorporated herein in its entirety by reference thereto.

Appendix B, which forms part of this disclosure, is a copy of the U.S. provisional patent application filed May 13, 1997, entitled "ISOLATED INTERRUPT STRUCTURE FOR INPUT/OUTPUT ARCHITECTURE" and assigned application Ser. No. 60/047,003. Page 1, line 17 of the provisional application has been changed from the original to positively recite that the entire provisional application, including the attached documents, forms part of this disclosure.

Appendix C, which forms part of this disclosure, is a copy of the U.S. provisional patent application filed May 13, 1997, entitled "THREE BUS SERVER ARCHITECTURE WITH A LEGACY PCI BUS AND MIRRORED I/O PCI BUSES" and assigned application Ser. No. 60/046,490. Page 1, line 15 of the provisional application has been changed from the original to positively recite that the entire provisional application, including the attached documents, forms part of this disclosure.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates generally to information processing systems, such as computer servers and personal computers (PCs). More particularly, this invention relates to the transfer of control and data signals within an information processing system having multiple bus architecture.

2. Description of the Related Art

Information processing systems, such as personal computers (PCs), have virtually become an inseparable part of everyone's daily activities. These systems process an enormous amount of information in a relatively short time. To perform these sophisticated tasks, the computer system typically includes a microprocessor, memory modules, various system and bus control units, and a wide variety of data input/output (I/O) and storage devices. These computer components communicate information using various data rates and protocols over multiple system buses. The demand for faster processing speeds, and the revolutionary fast-track development of computer systems, have necessitated the use of interconnecting devices. These devices act as bridges among various data transfer protocol within the computer system. One example of such interconnecting devices is the peripheral component interconnect (PCI) bridge.

The PCI Local Bus Specification, Revision 2.1 ("PCI Specification") defines a PCI Local Bus with the primary goal of establishing an industry standard. The PCI Local Bus is a 32-bit or 64-bit bus with multiplexed address and data lines. The bus is intended for use as an interconnect mechanism between highly integrated peripheral controller components, peripheral add-in boards, and processor/memory systems. The PCI Specification includes the protocol, electrical, mechanical, and configuration specification for PCI Local Bus components and expansion boards. The electrical definition provides for 5.0 V (e.g., desktop PCs) and 3.3 V (e.g., mobile PCs) signaling environments.

Typical PCI Local Bus implementations support up to four add-in boards. An add-in board is a circuit board that plugs into a motherboard and provides added functionality. The motherboard is the main circuit board which contains the basic function (e.g., a central processing unit or CPU, I/O, and expansion connectors) of a computer system. FIG. 1 shows a typical PCI Local Bus system architecture. As shown in FIG. 1, a processor 102, a cache 104, and a dynamic random access memory (DRAM) 106 are connected to a PCI Local Bus 112 through a PCI Bridge 108. The PCI Bridge 108 provides the logic that connects one bus to another to allow an agent (i.e., an entity that operates on a computer bus) on one bus to access an agent on the other. The PCI Bridge 108 provides a low latency path through which the processor 102, the cache 104, and DRAM 106 may directly access PCI devices mapped anywhere in the memory or I/O address spaces. Typical PCI devices include an audio card 116, a motion video card 120, a local area network (LAN) interface 124, a small computer system interface (SCSI) 128, an expansion bus interface 132, and a graphics card 136. The expansion bus interface 132 typically connects industry standard architecture (ISA) and extended ISA (EISA) devices (not shown in this figure) to the PCI local bus 112 via an ISA, EISA, or MicroChannel 140. The expansion bus interface 132 is often referred to as the ISA/EISA bridge.

PCI bus drivers spend a relatively large portion of time in transient switching. PCI bus drivers are specified in terms of their AC switching characteristics. Specifically, the voltage to current relationship (V/I curve) of the driver through its active switching range is the primary means of specification. The PCI Specification defines that PCI bus drivers achieve acceptable AC switching behavior in typical configurations of six loads on the motherboard and two expansion connectors (each is considered as two loads). The PCI bus drivers can also achieve acceptable switching behavior in configurations of two loads on the mother board and four expansion connectors. Hence, the loading capacity on the PCI Local Bus 112 is limited to ten loads. In practice, however, a standard PCI configuration uses a Processor-to-PCI bridge to generate the PCI bus with up to four card slots thereon. Violation of expansion board trace length or loading limits may compromise system signal integrity.

The foregoing loading limits have imposed serious restrictions on system designers, and prevented the addition of new functions to computer systems. Several attempts have been made to increase the loading capacity of a PCI bus. One approach involves implementing a Processor-to-PCI bridge by coupling it to a local processor bus (i.e., the bus to which the CPU is connected). The Processor-to-PCI bridge provides a connection between the local processor bus and a PCI bus. As noted above, the loading capacity of such a PCI Chipset bridge, however, is limited to four card slots. With the increasing performance demands on personal computers, such load capacity remains insufficient. Accordingly, there is a need in the technology to expand the loading capacity of a PCI bus. Such expansion of loading capacity will ensure the demands of adding powerful features to already overburdened information processing systems can be met.

SUMMARY OF THE INVENTION

To overcome the limitations of the related art, the invention provides a method for expanding the loading capacity of a PCI bus beyond its maximum loading capacity. The invention fully complies with the PCI Specification and does not compromise the system signal integrity.

According to one embodiment of the invention, a PCI bridge system for expanding the loading capacity of a PCI bus is provided. The PCI bridge system allows the expansion of the loading capacity of a PCI bus up to sixteen add-in board connectors ("card slots"). In this embodiment, a first-to-second bridge (e.g., the "processor-to-PCI bridge") connects a local processor bus to four second-to-third bridges (e.g., the "PCI-to-PCI bridges"). Each PCI-to-PCI bridge supports up to four PCI card slots via its unique PCI bus. Hence, the PCI bridge system results in expanding the PCI bus to sixteen card slots without violating the loading capacity or signal integrity of the system.

In another embodiment of the invention, two or more processor-to-PCI bridges are integrated with the local processor bus. Each processor-to-PCI bridge connects the local processor bus to four PCI-to-PCI bridges via its unique PCI bus. Each PCI-to-PCI bridge supports up to four PCI card slots via its unique PCI bus. A third processor-to-PCI bridge is connected to the local processor bus to function as a compatibility bridge. The implementation of two processor-to-PCI bridges in a symmetric architecture adds redundancy and fault tolerance characteristics to the system. Additionally, any system breakdowns due to single-point failures is minimized.

BRIEF DESCRIPTION OF THE DRAWINGS

The above and other aspects, features and advantages of the invention will be better understood by referring to the following detailed description, which should be read in conjunction with the accompanying drawings, in which.

DETAILED DESCRIPTION OF THE INVENTION

Figure 1:
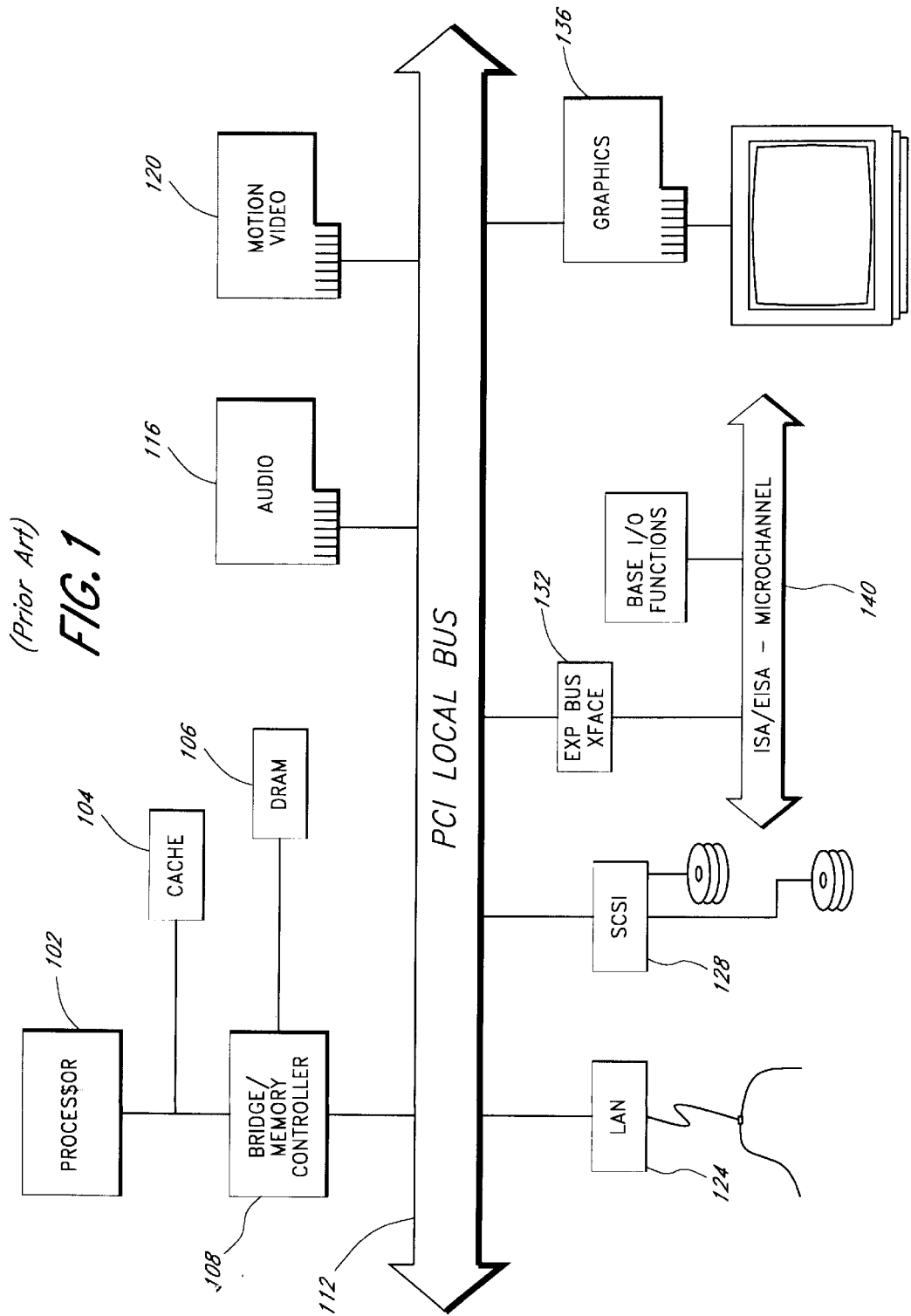
FIG. 1 is a block diagram of a conventional PCI local bus architecture in a computer system.
Figure 2:
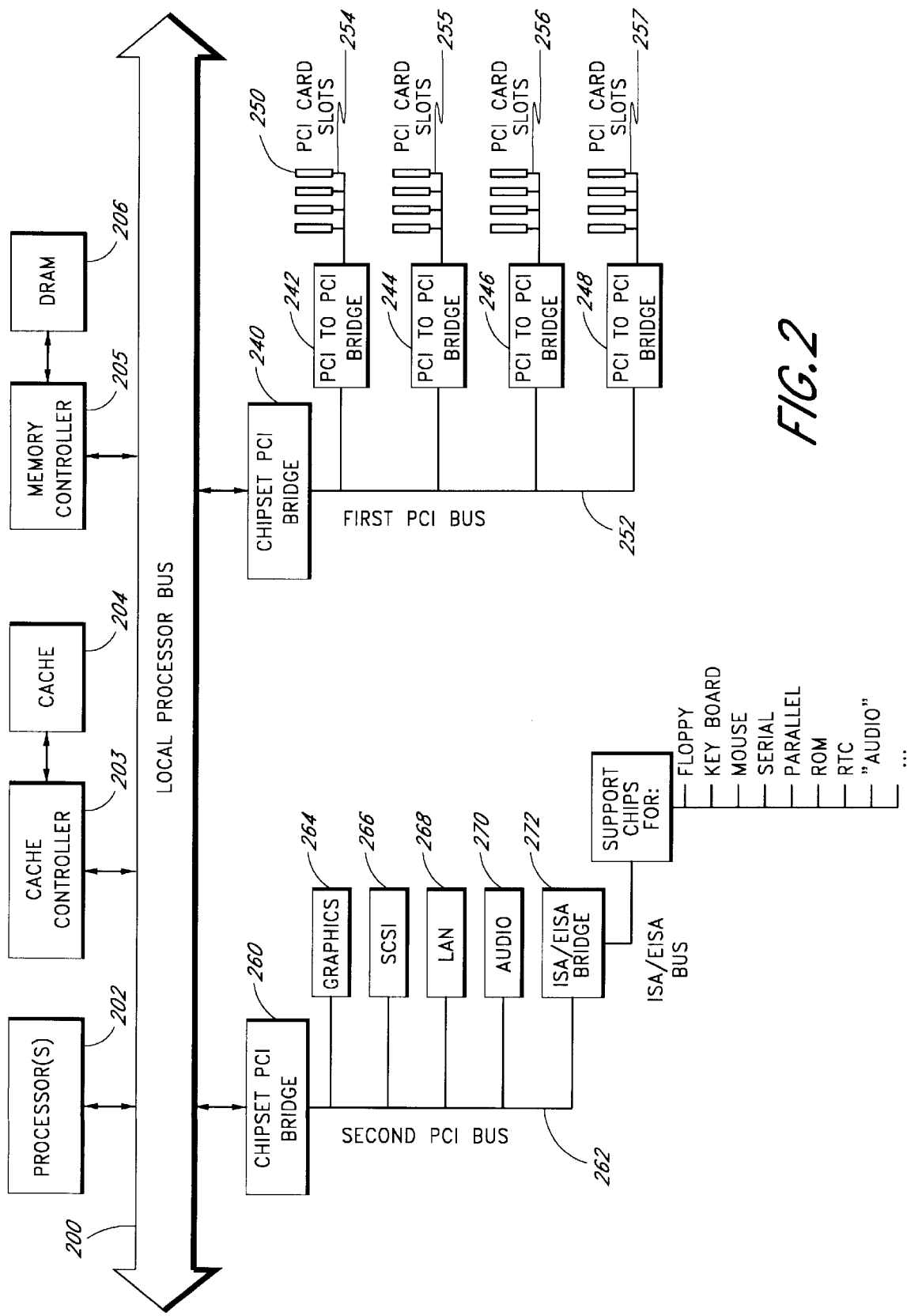
FIG. 2 is a block diagram of a local processor bus architecture implemented according to one embodiment of the invention.

The invention provides a method for expanding the loading capacity of a PCI bus in an information processing system (the "computer system"). In a first embodiment, the invention provides a method for expanding the loading capacity of a PCI bus up to sixteen card slots. FIG. 2 shows a block diagram of a local processor bus architecture implemented in this first embodiment. As shown in FIG. 2, a Local Processor Bus 200 is provided to support the transfer of control and data signals among various devices within a computer system. In this embodiment, one or more processor 202 is connected to the Local Processor Bus 200 to communicate with the other devices installed within the computer system. A Cache 204 is coupled to a Cache Controller 203 which is connected to the Local Processor Bus 200. Dynamic random access memory (DRAM) 206 is coupled to a Memory Controller 205 which is connected to the Local Processor Bus 200.

A Chipset PCI Bridge 240 is connected to the Local Processor Bus 200 to provide access by a variety of PCI devices on a First PCI Bus 252 to the Local Processor Bus 200. The Chipset PCI Bridge 240 generates the First PCI Bus 252 when connected to the Local Processor Bus 200. Another Chipset PCI Bridge 260 is coupled to the Local Processor Bus 200 as a "compatibility bridge." The Chipset PCI Bridge 260 generates a Second PCI Bus 262 when connected to the Local Processor Bus 200. The Chipset PCI Bridge 260 is a compatibility bridge because compatibility devices of a personal computer (PC) are located on its Second PCI Bus 262. With this configuration, the Chipset PCI Bridge 240 "knows" that it is a non-compatibility bridge and initializes itself with different power-on default values compared to the Chipset PCI Bridge 260. The two Chipset PCI Bridges 240 and 260 are considered peers at the host level. A chipset PCI bridge may be based on the 82450/82454 family of PCI Chipsets manufactured by Intel Corporation.

Four PCI-to-PCI Bridges 242, 244, 246, and 248, are connected to the First PCI Bus 252 to provide access to the Local Processor Bus 200 via the Chipset PCI Bridge 240. Each PCI-to-PCI Bridge (242, 244, 246, and 248) fully complies with the PCI Specification, and has full support for delayed transactions, which enables the buffering of memory read, I/O, and configuration transactions. Each PCI-to-PCI Bridge (242, 244, 246, and 248) provides a connection between two independent PCI buses. The first independent bus is the First PCI Bus 252 which is common to all the PCI-to-PCI bridges. The First PCI Bus 252 is often referred to as the primary PCI bus in view of its close proximity to the processor 202. Each PCI-to-PCI bridge has its unique secondary PCI bus. The unique four PCI buses are the Secondary PCI Buses 254, 255, 256, and 257. These PCI buses are secondary PCI buses because they are farthest from the Local Processor Bus 200.

Each PCI-to-PCI Bridge (242, 244, 246, and 248) supports buffering of simultaneous multiple posted write and delayed transactions in both directions. Each PCI-to-PCI Bridge (242, 244, 246, and 248) allows the Local Processor Bus 200 and each of its respective Secondary PCI Buses (254, 255, 256, and 257) to operate concurrently. A master and target on the same PCI bus may communicate while the other PCI bus is busy. The term "target" refers to a device on the PCI bus which responds with a positive acknowledgement to a bus transaction initiated by a master.

If its internal arbiter is used, each of the PCI-to-PCI Bridges (242, 244, 246, and 248) supports up to four PCI bus master devices on its respective Secondary PCI Bus (254, 255, 256, and 257). Four add-in board connectors 250 (the "PCI Card Slots") are connected to each of the Secondary PCI Buses 254, 255, 256, and 257, to provide access of PCI devices to the Local Processor Bus 200. The connector that supports each PCI Card Slot 250 is derived from a Micro Channel (MC)-style connector. MC systems are based on an architecture expansion bus defined by IBM for its PS/2 line of personal computers. The same PCI expansion board can be used in an ISA-, EISA-, and MC-based systems, provided that the motherboard supports PCI card slots in combination with ISA, EISA, and MC card slots. PCI expansion cards use an edge connector and motherboards that allow a female connector be mounted parallel to the system bus connectors. To provide a quick and easy transition from 5.0 V to 3.3 V component technology, there are two types of add-in board connectors: one for the 5.0 V signaling environment and one for the 3.3 V signaling environment.

Arbitration is provided to coordinate data transfers among PCI devices installed in the PCI Card Slots 250. On the primary bus, the Chipset PCI Bridge 240, or an independent arbiter (not shown in this figure), arbitrates the use of the First PCI Bus 252 when forwarding upstream transactions. On a secondary bus, each PCI-to-PCI bridge, or an independent arbiter (not shown in this figure), arbitrates for use of its respective secondary PCI bus for the downstream transactions. The arbiter for the primary bus may reside on the motherboard (not shown in this figure) which is external to the PCI Chipset Bridge 240. For each secondary PCI bus, each PCI-to-PCI bridge implements an internal arbiter (not shown in this figure). If desired, this arbiter may be disabled, and an external arbiter may be used instead. The PCI-to-PCI bridge may be based on the chips 21050/21152 PCI-to-PCI Bridges manufactured by Digital Equipment Corporation.

As noted above, the Chipset PCI Bridge 260 operates as a compatibility bridge. It generates a Second PCI Bus 262 when connected to the Local Processor Bus 200. As a compatibility bridge, typical PC devices may be connected to its Second PCI Bus 262 to access devices which are resident on the Local Processor Bus 200. Typical personal computer PCI devices may include a graphics interface 264, a SCSI 266, a LAN interface 268, an audio interface 270, and an ISA/EISA bridge 272. The ISA/EISA bridge connects industry standard architecture (ISA) extended ISA (EISA) devices (not shown in this figure) to the Local Processor Bus 200. These ISA devices may include a floppy drive, a key board, a mouse, a serial port, a parallel port, a read only memory (ROM) unit, a real-time clock (RTC), and an audio interface.

Figure 3:
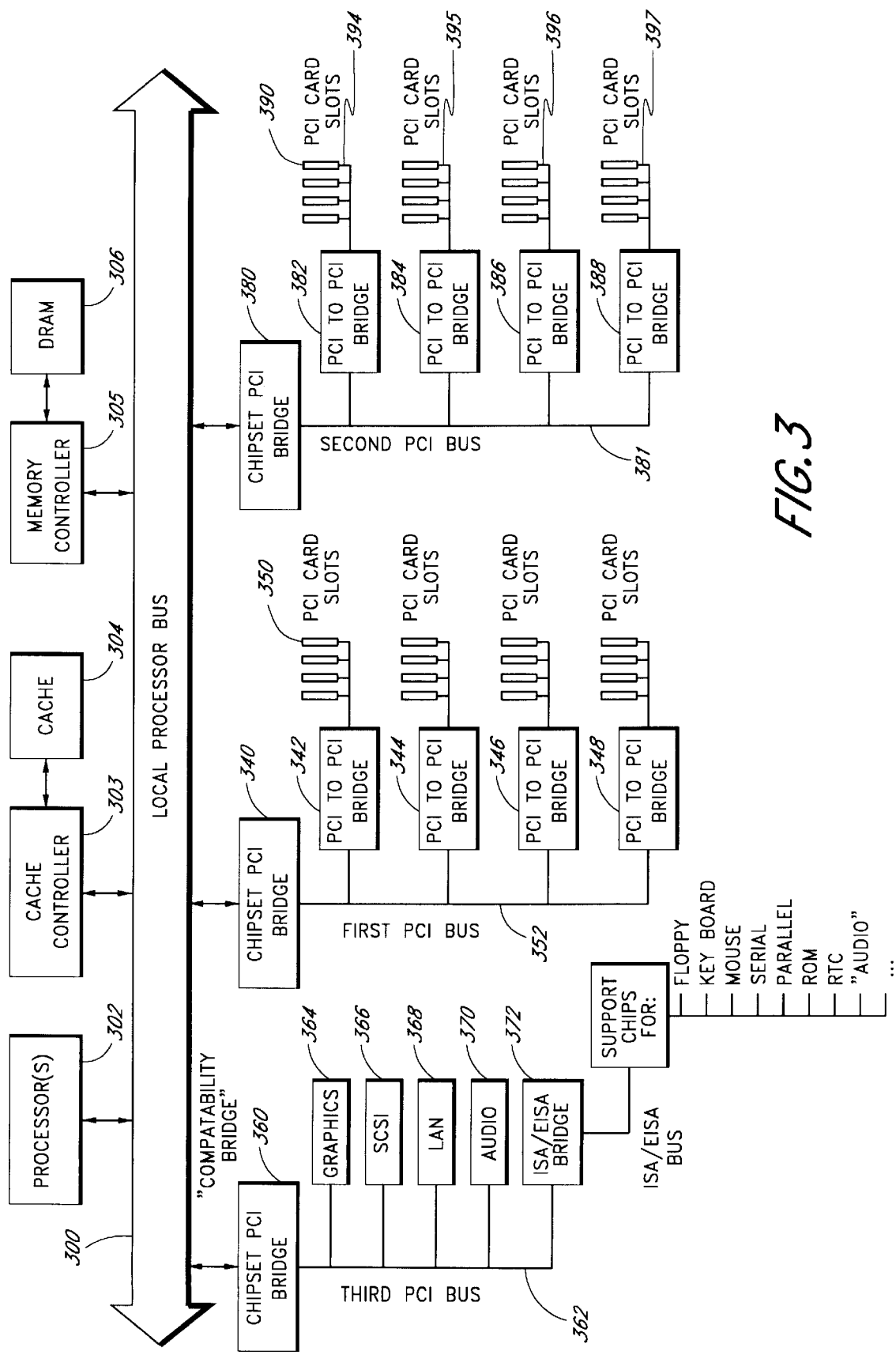
FIG. 3 is a block diagram of a local processor bus architecture implemented according to another embodiment of the invention.
Figure 1:
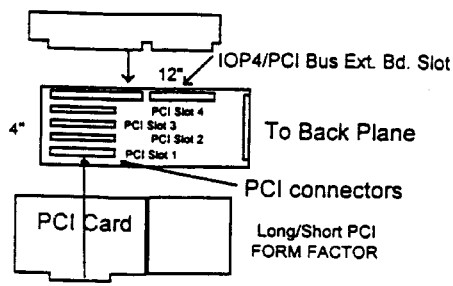
Figure 2:
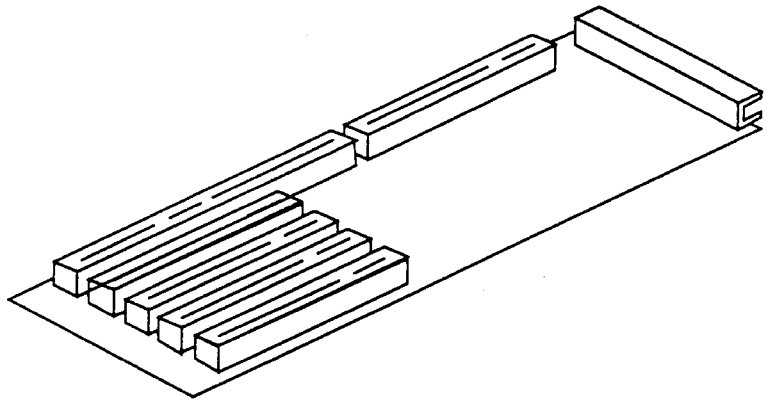

Referring now to FIG. 3, a block diagram of a PCI bus architecture implemented as a second embodiment of the invention is shown. As shown in FIG. 3, a Local Processor Bus 300 is provided to support the transfer of control and data signals among various devices within a computer system. In this embodiment, one or more processor 302 is connected to the Local Processor Bus 300 to communicate with the other devices installed within the computer system. A Cache 304 is coupled to a Cache Controller 303 which is connected to the Local Processor Bus 300. A dynamic random access memory (DRAM) 306 is coupled to a Memory Controller 305 which is connected to the Local Processor Bus 300.

A Chipset PCI Bridge 340 is connected to the Local Processor Bus 200 to provide access by a variety of PCI devices on a First PCI Bus 352 to the Local Processor Bus 300. Similarly, another Chipset PCI Bridge 360 is connected to the Local Processor Bus 200 to provide access by a variety of PCI devices on a Second PCI Bus 381 to the Local Processor Bus 300. A third Chipset PCI Bridge 360 is coupled to the Local Processor Bus 300 as a "compatibility bridge." The Chipset PCI Bridge 360 generates a Third PCI Bus 362 when connected to the Local Processor Bus 300. The Chipset PCI Bridge 360 is a compatibility bridge because compatibility devices of a personal computer (PC) are located on its Third PCI Bus 362. The Chipset PCI Bridge 360 interconnects PCI devices and an ISA/EISA bridge in the same manner described in FIG. 2.

Four PCI-to-PCI Bridges 342, 344, 346, and 348, are connected to the First PCI Bus 352, and another four PCI-to-PCI Bridges 382, 384, 386, and 388, are connected to the Second PCI Bus 381. The Chipset PCI Bridge 340 provides the PCI-to-PCI Bridges 342, 344, 346, and 348, with access to the Local Processor Bus 300. Similarly, the Chipset PCI Bridge 380 provides the PCI-to-PCI Bridges 382, 384, 386, and 388, with access to the Local Processor Bus 300. The specifications of each PCI-to-PCI Bridge (342, 344, 346, 348, 382, 384, 386, and 388) are similar to the specifications of the PCI-to-PCI Bridges 242, 244, 246, and 248 described in FIG. 2. Each of the PCI-to-PCI Bridges (342, 344, 346, and 348) provides a connection between two independent PCI buses. The first independent bus is the First PCI Bus 352 which is common to all these PCI-to-PCI bridges. The First PCI Bridge 352 is often referred to as the primary PCI bus in view of its close proximity to the processor 302. Similarly, each of the PCI-to-PCI Bridges (382, 384, 386, and 388) provides a connection between two independent PCI buses. The first independent bus is common to all these PCI-to-PCI bridges: Second PCI Bus 381 which is referred to as the primary PCI bus in view of its close proximity to the Local Processor Bus 300. Each PCI-to-PCI bridge has its unique secondary PCI bus. A first set of unique PCI buses is the Secondary PCI Buses 354, 355, 356, and 357. These PCI buses are secondary PCI buses because they are farthest from the Local Processor Bus 300. A second set of unique PCI buses is the Secondary PCI Buses 394, 395, 396, and 397. These PCI buses are secondary PCI buses because they are farthest from the Local Processor Bus 300.

Each of the PCI-to-PCI Bridges (342, 344, 346, 348, 382, 384, 386, and 388) supports up to four PCI bus master devices on its respective Secondary PCI Bus (354, 355, 356, 357, 394, 395, 396, and 397). Each of the Secondary PCI Buses 354, 355, 356, and 357, supports four add-in board connectors 350 (the "PCI Card Slots") to provide access for PCI devices to the Local Processor Bus 300. Similarly, each of the Secondary PCI Buses 394, 395, 396, and 397 supports four add-in board connectors 390 (the "PCI Card Slots") to provide access for PCI devices to the Local Processor Bus 300. The specifications of each PCI Card Slot 350 and 390 are preferably similar to the specifications of the PCI Card Slots 250 described in FIG. 2. Arbitration is provided to coordinate data transfers among PCI devices in the same manner described in FIG. 2.

The PCI architecture of each of the Chipset PCI Bridge 340 and 380 may optionally be identical to or different from the other. More particularly, if the PCI Card Slots 350 and 390 are supporting substantially identical PCI devices, a substantially symmetric PCI bridge architecture is achieved. A key advantage of such a symmetric architecture includes the redundant or fault-tolerant characteristic of a PCI signal path. For instance, if the Chipset PCI Bridge 340 fails, or any or all of its PCI-to-PCI bridges fail, the availability of the Chipset PCI Bridge 380 ensures access between the PCI Card Slots 390 and the Local Processor Bus 300. Similarly, if the Chipset PCI Bridge 380 fails, or any or all of its PCI-to-PCI bridges fail, the availably of the Chipset PCI Bridge 340 ensures access between the PCI Card Slots 350 and the Local Processor Bus 300. Moreover, in view of the availability of an alternative signal path between PCI devices and the Local Processor Bus 300, the possibility of a single-point failure is minimized. A single-point failure is defined as a failure occurring at a single point in the system wherebecause the entire system fails.

From the standpoint of the Local Processor Bus 300, the loading of each of the Chipset PCI Bridges 340, 360, and 380 with all its supported PCI devices are considered one load. Using this PCI bridge architecture, the loading capacity of the Local Processor Bus 312 is not violated. More importantly, the sharing of the PCI signals among the newly created thirty-two PCI Card Slots 350 and 390 does not compromise the system signal integrity.

In view of the foregoing, it will be appreciated that the invention overcomes the longstanding need for expanding the loading capacity of a PCI bus without the disadvantages of compromising system signal integrity. The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

Appendix A
Incorporation by Reference of Commonly Owned Applications
The following patent applications, commonly owned and
filed October 1 1997,
are hereby incorporated herein in their
entirety by reference thereto:

| Title | Application No. | Attorney Docket No. |
|---|---|---|
| "System Architecture for Remote Access and Control of Environmental Management" | 08/942,160 | MNFRAME.002A1 |
| "Method of Remote Access and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Distributed Processor System" | 08/942,448 | MNFRAME.005A2 |
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |
| "Hot Add of Devices Software Architecture" | 08/942,309 | MNFRAME.006A1 |
| "Method for The Hot Add of Devices" | 08/942,306 | MNFRAME.006A2 |
| "Hot Swap of Devices Software Architecture" | 08/942,311 | MNFRAME.006A3 |
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |

-continued

Appendix A
Incorporation by Reference of Commonly Owned Applications
The following patent applications, commonly owned and
filed October 1 1997,
are hereby incorporated herein in their
entirety by reference thereto:

| Title | Application No. | Attorney Docket No. |
|---|---|---|
| "Method for the Hot Add of a Mass Storage Adapter on a System Including a Dynamically Loaded Adapter Driver" | 08/962,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a System Including a Dynamically Loaded Adapter Driver" | 08/942,458 | MNFRAME.006A12 |
| "Method of Performing an Extensive Diagnostic Test in Conjunction with a BIOS Test Routine" | 08/942,463 | MNFRAME.008A |
| "Apparatus for Performing an Extensive Diagnostic Test in Conjunction with a BIOS Test Routine" | 08/942,163 | MNFRAME.009A |
| "Configuration Management Method for Hot Adding and Hot Replacing Devices" | 08/941,268 | MNFRAME.010A |
| "Configuration Management System for Hot Adding and Rot Replacing Devices" | 08/942.408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 08/942,333 | MNFRAME.020A |
| "Method of Resetting a Server" | 08/942,405 | MNFRAME.021A |
| "System for Displaying Flight Recorder" | 08/942,070 | MNFRAME.022A |
| "Method of Displaying Flight Recorder" | 08/942,068 | MNFRAME.023A |
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Graphical User Interface" | 08/943,357 | MNFRAME.028A |
| "Display of System Information" | 08/942,195 | MNFRAME.029A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |
| "Alert Configurator and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |

-continued

Appendix A
Incorporation by Reference of Commonly Owned Applications
The following patent applications, commonly owned and
filed October 1 1997,
are hereby incorporated herein in their
entirety by reference thereto:

| Title | Application No. | Attorney Docket No. |
|---|---|---|
| "Computer Fan Speed Control System Method" | 08/941,267 | MNFRAME.035A |
| "Black Box Recorder for Information System Events" | 08/942,381 | MNFRAME.036A |
| "Method of Recording Information System Events" | 08/942,164 | MNFRAME.037A |
| "Method for Automatically Reporting a System Failure in a Server" | 08/942,168 | MNFRAME.040A |
| "System for Automatically Reporting a System Failure in a Server" | 08/942,384 | MNFRAME.041A |
| "Expansion of PCI Bus Loading Capacity" | 08/942,404 | MNFRAME.042A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Oenerated Pulse Waveform Between Two Servers in a Network" | 08/942,221 | MNFRAME.048A |
| "A System for Communicating a Software Oenerated Pulse Waveform Between Two Servers in a Network" | 08/942,409 | MNFRAME.049A |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automatically Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 08/942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

Provisional Patent Applications
6391-706
Title: ISOLATED INTERRUPT STRUCTURE FOR INPUT/OUTPUT ARCHITECTURE
Invs: Dennis H. Smith
   Stephen E. J. Papa The present invention provides for a system architecture with a three PCI bus structure. The first PCI bus is coupled to the legacy components of the standard personal computer, such as a display system, a keyboard, a bios structure and the like. The other two buses are coupled to high capacity input/output devices such as disk drives and network connections. The interrupt structure for the I/O buses bypasses the interrupt structure for the legacy components and is coupled directly to host CPUs through the APIC bus.

The following documents are attached and form part of this disclosure:

1. *Mother Board Draft of Architecture and Technology,* Sept. 30, 1995, pp. 1–4.
2. *Mother Board SIO and Peripheral Logic (SPL),* Revision 0.9, May 6, 1997, 5 pages (not numbered)
3. *Back Plane Board Specifications,* Version 0.08, Apr. 19, 1996, pp. 1–10.
4. *I/O Canister Assembly Specifications,* Version 0.06, Apr. 15, 1996, pp. 1–5.

Provisional Patent Applications
6391-706
Title: ISOLATED INTERRUPT STRUCTURE FOR INPUT/OUTPUT ARCHITECTURE
Invs: Dennis H. Smith
   Stephen E. J. Papa The present invention provides for a system architecture with a three PCI bus structure. The first PCI bus is coupled to the legacy components of the standard personal computer, such as a display system, a keyboard, a bios structure and the like. The other two buses are coupled to high capacity input/output devices such as disk drives and network connections. The interrupt structure for the I/O buses bypasses the interrupt structure for the legacy components and is coupled directly to host CPUs through the APIC bus.

The following documents are attached and incorporated by reference:

1. *Mother Board Draft of Architecture and Technology,* Sept. 30, 1995, pp, 1–4.

2. *Mother Board SIO and Peripheral Logic (SPL),* Revision 0.9, May 6, 1997, 5 pages (not numbered)

3. *Back Plane Board Specifications,* Version 0.08, Apr. 19, 1996, pp. 1–10.

4. *I/O Canister Assembly Specifications,* Version 0.06, Apr. 15, 1996, pp. 1–5.

The following provisional patent applications, commonly owned and filed on the same day as the present application, are related to the present application and are incorporated by reference:

COMPUTER SYSTEM HARDWARE INFRASTRUCTURE FOR HOT PLUGGING MULTI-FUNCTION PCI CARDS WITH EMBEDDED BRIDGES (6391-704); invented by:
 Don Agneta
 Stephen E. J. Papa
 Michael Henderson
 Dennis H. Smith
 Carlton G. Amdahl
 Walter A. Wallach COMPUTER SYSTEM HARDWARE INFRASTRUCTURE FOR HOT PLUGGING SINGLE AND MULTI-FUNCTION PC CARDS WITHOUT EMBEDDED BRIDGES (6391-705); invented by:
 Don Agneta
 Stephen E. J. Papa
 Michael Henderson
 Dennis H. Smith
 Carlton G. Amdahl
 Walter A. Wallach ISOLATED INTERRUPT STRUCTURE FOR INPUT/OUTPUT ARCHITECTURE (6391-706); invented by:
 Dennis H. Smith
 Stephen E. J. Papa THREE BUS SERVER ARCHITECTURE WITH A LEGACY PCI BUS AND MIRRORED I/O PCI BUSES (6391-707); invented by:
 Dennis H. Smith
 Carlton G. Amdahl
 Don Agneta HOT PLUG SOFTWARE ARCHITECTURE FOR OFF THE SHELF OPERATING SYSTEMS (6391-708); invented by:
 Walter A. Wallach
 Mehrdad Khalili
 Mallikarunan Mahalingam
 John Reed REMOTE SOFTWARE FOR MONITORING AND MANAGING ENVIRONMENTAL MANAGEMENT SYSTEM (6391-709); invented by:
 Ahmad Nouri.

REMOTE ACCESS AND CONTROL OF ENVIRONMENTAL MANAGEMENT SYSTEM (6391-710); invented by:
 Karl Johnson
 Tahir Sheik HIGH PERFORMANCE NETWORK SERVER SYSTEM MANAGEMENT INTERFACE (6391-711); invented by:
 Srikumar Chari
 Kenneth Bright
 Bruno Sartirana CLUSTERING OF COMPUTER SYSTEMS USING UNIFORM OBJECT NAMING AND DISTRIBUTED SOFTWARE FOR LOCATING OBJECTS (6391-712); invented by:
 Walter A. Wallach
 Bruce Findley Mother Board Draft of Architecture and Technology Rev 3.0
Sep. 30, 1995
1.0 Components
 1.1 CPU The CPU board will support between 1 and 4 P6 CPU's, using an integrated 512K L2 cache. Each CPU will run at the same bus to core speed ratio. Faster processors may be mixed with slower processors however the faster processors must run at the same bus to core speed ratio, which would then negate the effect of their faster speed. The bus to core ratio circuit is changeable under software control from the internal CDM system. The target processor speed is 166 Mhz internal however it will support processors of other speeds.

1.2 Chipset

The CPU board will use the Intel 450GX Orion chipset There will be one memory controller on the CPU board using the OMCDP and the OMCDC. These are a Data Path Control and a Memory Controller respectively. There will be three OPB P6 to PCI bridges. Two PCI buses will route off the board to standard PCI to PCI bridges. One PCI bus will remain resident on the board and bridge to ISA.

1.3 Memory
  1.3.1 Memory Type

The CPU board will use 3.3 v DIMMS. These will be JEDEC ECC standard pinout. Rev 1 and Rev 4 CPU boards will only support single bank DIMMS, Rev 5 CPU board will support single or dual bank DIMMS. Refresh rate is not an issue as we use CAS before RAS refresh. The memory controller will also support mixed density DIMMs across different banks, but not within any one bank. Software will read a the DIMM type through the CDM bus.

1.3.2 Memory Banks

There will be 16 physical DIMM sockets on the CPU board. These will accept any standard DIMM module as specified above. Therefore each socket will support one ROW of memory. Four DIMMs will be required to complete one bank of memory. There will be a maximum of 8 banks of DIMMs for the CPU board, contained with in 4 multiplexed banks.

1.3.3 Memory Capacity

The maximum amount of memory supportable by the ORION chipset is 4 GigaBytes. The maximum amount of memory the CPU board can support using currently available DIMMs is 2 GB. This 2 GB is obtainable using 16M×72 DIMMs (128 MB). Next generation DIMMs using 64 Mbit technology DRAM chipsor dual bank DIMMS will allow the CPU board to be populated to a maximum of 4 GB using 256 MB modules.

1.3.4 ECC Coverage

Each 72 bit word has 18 bits located in each of the 4 DIMMS that make up the memory banks. Using this strategy, each 72 bit read from the DIMM's will be single bit correctable and double bit detectable. Each DIMM will be protected by 4 bit ECC, which allows for a failure of any ×4

DRAM chip component on the DIMM without producing errors in memory. Using DIMMS with x4 chips 2.0 PCI Buses & I/O Subsytem The CPU board will support 3 PCI buses. These will be 32 bit buses. The bus speed will be 33 Mhz. The arrangement of the bus loads is detailed in the Backplane and I/O board specification. The arrangement of these loads will not violate any drive specification of the OPB or PCI specification.

The ISA I/O subsystem will be located on the CPU board. This is covered in a separate specification.

3.0 Clocks 3.1 CPU Clocks

The CPU board will derive its clocks from an on board oscillator. This oscillator will drive a T1 clock buffer which is not a PLL. The tolerance achievable by ganging the outputs together of this driver are tighter than a PLL. The bus clock speed will be 66 Mhz All clock traces on the board will be in inner layers and will be of equal lengths.

3.2 PCI Clocks

The CPU board will supply a single PCI clock to the backplane. The backplane will have the clock driver chip that will distribute PCI clks to all slots on the backplane. The CPU board will receive 2 of these PCI clks, one for each OPB that drives the PCI buses for the backplane.

The PCI bus resident on the motherboard will have its own clock driver and supply the resident PCI loads from that source.

3.3 APIC Clocks

The APIC CLK will be input from the backplane. The CPU board will receive, not generate this clk. This must be a 3.3 v level.

4.0 Monitoring Devices

The CPU board will contain a CDM bus chip to monitor temperature behind the P6 processors. It will also sample the IERR lines from the processor for indication of internal processor error. It will also sample the THERMTRIP output from the processors. These are open collector signals from the processor, which will be read seperately by the CDM bus to identify the faulted processor.

5.0 Backplane Interface

The CPU board will interface with the backplane with the following signals:

5.1 Signal OPB PCI Bus #2 OPB PCI Bus #3
  5.2 Clocks PCI Bus Clocks for all PCI buses #2, #3 APICCLK
  5.3 Sideband APIC Data Lines Power 6.0 Power 6.1 5 v The OPB 5 volt supply shall be sourced from the backplane.

6.2 Processor Core Power 2.1 v–3.3 v

The processor core will receive power from a separate DC to DC converter specified specifically for use with P6 processors. Each P6 will have its own DC—DC converter. No P6 will share a processor core power plane with any other P6. The core power plane will have additional bypassing in the form of 5 33 uf low ESR tantalum capacitors. The primary input for these power modules shall be the 5 volt supply. Additionally these supplies may require a small amount of +12 for bias. Each of the modules will be socketed to allow for easy replacement and Intel Overdrive Upgrade compatibility.

6.3 3.3 v

The CPU L2, Orion Chipset, Memory, Clocks and other buffers and gates uses 3.3 volts. This will be sourced from the backplane.

6.4 Vterm Termination Power 1.5 v

Power for the P6 bus terminators shall be produced by two separate Linear regulators, one each located at each physical end of the P6 bus. Power to the regulators shall be from the general 3.3 volt supply (not processor core). Both the input and outputs of the regulators require additional bypassing.

6.5 Vref GTL Reference Voltage 1.0 v

The GTL reference voltage is generated from the Vterm power using a simple resistor divider network.

6.6 GND

The GND signals shall be distributed across two rows of the targeted connector. These rows shall be placed such that they separate the three signals rows.

6.7 12 v 12 v will be source from the backplane board.

7.0 Connector 7.1 Signal

The CPU board Connector shall be a Robinson Nugent Meta Pack 2 connector or equivalent. It will consist of 5 rows. Three rows will be dedicated for signals and two rows for ground. The connector shall be a female type on the CPU board, mating to a male header on the backplane board. It is not necessary to make this CPU board hot swappable as it is the only CPU board in the system. Therefore all pins for the CPU board mating connector on the backplane may be all the sarne length. Any other second source connector will have parasitic and transmission line specifications equal to or exceeding the specified connector.

At the time of this specfication the connector assigment for both signal and power are under review.

Provisional Patent Application 6391-707:
Title: THEE BUS SERVER ARCHITECTURE WITH A LEGACY PCI BUS AND MIRRORED I/O PCI BUSES
Invs: Carlton G. Amdahl
  Dennis H. Smith
  Don Agneta The present-invention provides a server architecture with redundant I/O buses which are isolated from the legacy PCI bus. This provides fault tolerance for the system moving the single point of failure in the device to the main memory module on the system bus.

The following documents are attached and form part of this disclosure:

1. *Mother Board Draft of Architecture and Technology,* Sep. 30, 1995, pp, 1–4.

2. *Mother Board SIO and Peripheral Logic* (*SPL*), Revision 0.9, May 6, 1997, 5 pages (not numbered)

3. *Back Plane Board Specifications,* Version 0.08, Apr. 19, 1996, pp. 1–10.

4. *I/O Canister Assembly Specifications,* Version 0.06, Apr. 15, 1996, pp. 1–5.

A means is provided by which no single component failure renders the monitoring and control capability of the system inoperable.

The following provisional patent applications, commonly owned and filed on the same day as the present application, are related to the present application and are incorporated by reference:

COMPUTER SYSTEM HARDWARE INFRASTRUCTURE FOR HOT PLUGGING MULTI-FUNCTION PCI CARDS WITH EMBEDDED BRIDGES (6391-704); invented by:
  Don Agneta
  Stephen E. J. Papa
  Michael Henderson
  Dennis H. Smith Carlton G. Amdahl
Walter A. Wallach COMPUTER SYSTEM HARDWARE INFRASTRUCTURE FOR HOT PLUGGING SINGLE AND MULTI-FUNCTION PC CARDS WITHOUT EMBEDDED BRIDGES (6391-705); invented by:
  Don Agneta
  Stephen E. J. Papa
  Michael Henderson
  Dennis H. Smith
  Carlton G. Amdahl
  Walter A. Wallach ISOLATED INTERRUPT STRUCTURE FOR INPUT/OUTPUT ARCHITECTURE (6391-706); invented by:
  Dennis H. Smith
  Stephen E. J. Papa THREE BUS SERVER ARCHITECTURE WITH A LEGACY PCI BUS AND MIRRORED I/O PCI BUSES (6391-707); invented by:
  Dennis H. Smith
  Carlton G. Amdahl
  Don Agneta HOT PLUG SOFTWARE ARCHITECTURE FOR OFF THE SHELF OPERATING SYSTEMS (6391-708); invented by:
  Walter A. Wallach
  Mehrdad Khalili
  Mallikarunan Mahalingam
  John Reed REMOTE SOFTWARE FOR MONITORING AND MANAGING ENVIRONMENTAL MANAGEMENT SYSTEM (6391-709); invented by:
  Ahmad Nouri REMOTE ACCESS AND CONTROL OF ENVIRONMENTAL MANAGEMENT SYSTEM (6391-710); invented by:
  Karl Johnson
  Tahir Sheik HIGH PERFORMANCE NETWORK SERVER SYSTEM MANAGEMENT INTERFACE (6391-711); invented by:
  Srikumar Chari
  Kenneth Bright
  Bruno Sartirana CLUSTERING OF COMPUTER SYSTEMS USING UNIFORM OBJECT NAMING AND DISTRIBUTED SOFTWARE FOR LOCATING OBJECTS (6391-712); invented by:
  Walter A. Wallach
  Bruce Findley MEANS FOR ALLOWING TWO OR MORE NETWORK INTERFACE CONTROLLER CARDS TO APPEAR AS ONE CARD TO AN OPERATING SYSTEM (6391-713); invented by:
  Walter A. Wallach
  Mallikarunan Mahalingam HARWARE AND SOFTWARE ARCHITECTURE FOR INTER-CONNECTING AN ENVIRONMENTAL MANAGEMENT SYSTEM WITH A REMOTE INTERFACE (6391-714); invented by:
  Karl Johnson
  Walter A. Wallach
  Dennis H. Smith
  Carl G. Amdahl SELF MANAGEMENT PROTOCOL FOR A FLY-BY-WIRE SERVICE PROCESSOR (6391-715); invented by:
  Karl Johnson
  Walter A. Wallach
  Dennis H. Smith
  Carl G. Amdahl I/O Canister Assembly Specification
Preliminary             Ver 0.06             NuFRAME Confidential

1.0 I/O Card Canister Assembly
    13-000066-01    I/O Canister Board
    13-000070-01    Active PCI Bus Extension Board
    13-000071-01    Passive PCI Bus Extension Board
    13-0000xx-01    I/O Server 4 (Future Product)

1.1 Main Assembly Features
- I/O Canister Board contains mostly passive components
- A PIC16C65 Chip to control several on-board Raptor System functions
- Four (4) slots for add-on PCI cards (no PMC at this time)
- One (1) slot dedicated to one of the following
  - Passive Extender Board
  - Active Extender Board
  - IOP4 Board (when available)
- OEM Boards for many standard interfaces will be qualified
- All PCI board control will be handled by main server processors (non-IOP4 unit)
- Entire I/O Card Canister Assembly can be hot swapped/added (Needs SW Support)
- Each I/O Card Canister Assembly will have redundant fans directly attached.

1.2 IOP4/PCI Bus Extension Slot
1.2.1 One dedicated slot on the I/O Canister Board will be for either the IOP4 (future) or one of the PCI Bus Extension Boards 1.2.2 The PCI Bus Extension Boards will be signal jumping boards through which all PCI Data/Control/Interrupt signals will be routed. This is so that there will be a way to break the PCI Bus path when the IOP4 board is used. (remove jumper Bd.) This then allows the IOP4 to have local control the PCI bus to the OEM PCI cards.

1.2.3 Both PCI Bus Extension Boards will have two LEDs extending through its EMI Shield. One yellow LED indicating a fan fault in the on Canister Fans and one Yellow/Green LED to indicate a FRU failure and that it is "safe" to remove the canister 1.2.4 The Passive PCI Bus Extension Board (13-000071-01)
  1.2.4.1 This board will be a simple pass through board in which all PCI signals are connected from the Back Plane to the PCI card slots.
  1.2.4.2 This is the preferred board from a cost and manufacturability standpoint.

1.2.5 The Active PCI Bus Extension Board (13-000070-01)
  1.2.5.1 This board will have a DEC PCI to PCI Bridge chip on it to buffer and forward the PCI Bus signals.

I/O Canister Assembly Specification
Preliminary                   Ver 0.06                   NeuFRAME Confidential 1.2.5.2 There will be a 5v to 3.3v Linear regulator on the Active PCI Bus Extension Board to produce local power for the Bridge chip 1.2.5.3 The DEC Bridge IDSEL = 2

1.2.5.4 Only one of the four possible REQ, GNT and CLK signals coming from the back Plane will be used by the DEC chip (REQ0, GNT0 and CLK0)

1.2.5.5 This board will be used only if it is determined that the PCI bus lengths of the Passive PCI Bus Extension Board are too long for reliable signal integrity.)

1.3 PCI Signal Handling

1.3.1 Each add on card on the PCI bus will have its IDSEL line mapped to a different primary device number (Slot 1 = 4, Slot 2 = 5, Slot 3 = 6, Slot 4 = 7)

1.3.2 All PCI Signals will be routed through the PCI Bus Extension Board (Active or Passive) so that they can be intercepted by the future IOP4 Board for local handling.

1.4 PCI Interrupt Handling

1.4.1 On each individual PCI slot all four PCI interrupts will be connected separately to the PCI Extender Board Slot (16 INTs - 4x4). On the PCI Extender Board, all the interrupts from each single board will be wired together to form four interrupts for the entire I/O Canister Assembly. (Slot#1 INTz-A,B,C,D = INTZ_S0 ; Slot#2: INTz-A,B,C,D = INTZ_S1; etc.) The four resultant interrupt lines will be routed to the Back Plane through the PCI Bus Extension Board and the Back Plane connector.

1.4.2 The 16 PCI Board interrupts can be swapped around on the PCI Bus Extension Boards to yield just about any combination of interrupts. This is done by making cuts and adding header blocks to the existing hole patterns. These will be used the software group to determine the optimum interrupt configuration for initial bring-up ONLY. The production boards will all be connected in the pattern that the software group approves.

1.5 Board Capacity

1.5.1 The PCI form factor board will handle up to four (4) of the long PC PCI (12.3") form factor cards.

1.5.2 All of the PCI OEM add on boards will be either +5v signal level PMC/PCI cards or UNIVERSAL PMC/PCI cards (at this time)

1.6 OEM Boards that will be qualified to run with the bridge board and our system will include the following:

1.6.1 SCSI Controller 1.6.2 Ultra SCSI Controller 1.6.3 Ethernet NIC (10Mbps)

1.6.4 Fast Ethernet NIC (100Mbps)

I/O Canister Assembly Specification
Preliminary      Ver 0.06      NetFRAME Confidential 1.6.5 Token Ring NIC (4/16Mbps)
    1.6.6 FDDI NIC
    1.6.7 Fibre Channel NIC
    1.6.6 ATM NIC

1.7 All board control will be handled by main server processors.
    1.7.1 Until the IOP4 is available, there is no PCI controlling circuitry on the canister board itself. The system processors must therefore control all data transfers to and between the OEM plug in cards.

1.8 Misc.
    1.8.1 Power Management for the Hot swap will be handled by having FET switches selectively turn power to the canister board on. (Controlled by the on-board CDM/Wire Service)
    -Each PCI card slot has an individual +5v FET Switch (cycled on one at a time)
    -all +12v &-12v on one switch
    1.7.2 Each PCI Canister Board has on it a one time programmable series prom for holding the serial number of the board. This PROM will be read by the CDM/Wire Service system on the Back Plane and used to determine weather or not a canister is plugged into any particular Canister Connector. (Canister present)
    1.7.2 Provisions have been left for a serial number prom to be placed on the IOP4 to be read by the CDM/Wire Service system on the Canister Board.

1.8 CDM/Wire Service Bus
    1.8.1 A PIC16C65 Chip will be used for the following functions:
- monitor PRSNT lines from each canister to determine which of the PCI Slots on each Canister are filled.
- monitor Canister Address lines to determine which Back Plane slot the canister is plugged into.
- control the Power to each PCI slot
- control the JTAG TMS line to the IOP4.
- control I/O NMI line to the IOP4.
- read the serial number PROM on the IOP4
- potentially control power on the IOP4.
- potentially determine what type of IOP is plugged into the dedicated slot
- control the FRU Fault LED on EMI Panel of each canister
- control the Fan Fault LED. on EMI Panel of each canister
- monitor the speed of the on canister fans.
- control the high/low speed line of the on canister fans.

NOTE:      PIC16C65 chips are to be powered from the main +5v coming from the system back plane.

I/O Cluster Assembly Specification

Preliminary    Ver 0.06    NetFRAME Confidential

Raptor Hardware Spec.    4/15/96

Back Plane Board Specifications

Preliminary          Ver 0.08          NetFRAME Confidential

1.0 Raptor Basic Back Plane

1.1 Main Board Features
- Connectors for 1 Mother Bd (2-32 bit PCI connectors & side band signals & Power)
- Connectors for 2 Hot Swappable Power Supplies
- Connectors for four (4) I/O Canister Bds (-each includes- 1-32 bit PCI connectors & side band signals & Power)
- Four PCI to PCI Bridge chips
- Two SIO chips connected to the APIC bus and PCI busses to handle PCI arbitration and interrupts
- Primary PCI Clock distribution chip on Back Plane
- Chassis Controller circuitry using CDM/Wire Service Network Chips
- Test Connectors to bring out certain debugging signals NOTE: All the PCB connectors on the Base Unit Back Plane are to be FEMALE pin connectors.

1.2 Mother Board Connectors
1.2.1 The Mother Board drives two separate PCI busses. These two are 32 bit PCI busses.
1.2.2 Connector space for the side band, power lines and spares is also provided. *******These lines are defined in the connector signal table at the end of this document.

1.3 Back Plane PCI Busses
1.3.1 The Back Plane contains two (2) independant PCI busses (PCI Bus #2 and PCI Bus #3)
1.3.2 Each PCI bus consists of one (1) OPB chip on the Mother Board, one (1) SIO chip on the Back Plane, and two (2) DEC PCI to PCI bridge chips on the Back Plane.
1.3.3 Each PCI bus has the same numbering scheme for devices connected to it.
- OPB IDSEL = 0 (on Mother Board)
- SIO IDSEL = 1

**** Bridge chips are numbered from the top down
- 1st Bridge Chip IDSEL = 2
- 2nd Bridge Chip IDSEL = 3

1.3.4 Each OPB on the Mother Board outputs a PCI Clock. The two PCI Clocks that go to the Back Plane PCI Busses are buffered and distributed by a 74FCT3805A chip. (dual 1 input,5 output) Each half of the chip handles one PCI bus.

1.4 PCI to PCI Bridge Chips
1.4.1 The Back Plane Board has four (4) DEC 21152 Bridge chips on it. The Primary side of the chips is connected to one of the two PCI busses

Back Plane Board Specifications

Preliminary          Ver 0.08          NetFRAME Confidential running from the Mother Board OPB chips. (2 chips on PCI #2 and 2 chips on PCI #3)

1.4.2 The secondary side of the bridge chips is connected to one of the four canister board connectors

1.5 PCI Canister Board Connectors 1.5.1 Each of the 4 PCI Canister Board Connectors contains a single 32 bit PCI bus.

1.5.2 Hot inserting of these boards is desirable. By controlling FETs on the Canister boards with a CDM chip, this is accomplished by turning on the power to each PCI slot in sequence.

1.5.3 Each of the two PCI busses goes to only 2 of the 4 PCI Canister Board slots. Each PCI bus connects to each PCI Canister Board slot on one side of the Back Plane. (the 2 slots on the right side or the 2 slots on the left side)

1.5.4 Connector space for the side band, power lines and spares will also be provided. *******These lines are defined in the connector signal table at the end of this document.

1.6 SIO Chip 1.6.1 The SIO chip uses the following of its functions:
- The APIC Bus
- IRQs 3,4,5,6,9,10,11,12
- The PCI Arbiter
- The PCI Bus 1.6.3 The four Interrupt lines from each I/O Canister card (1 per PCI slot) will be routed to one of the two SIO chips on the Back Plane. Each SIO Chip will be used as an interrupt controller for one of the PCI busses and be connected to the Mother Board APIC bus.

****For Back Plane PCI Bus 2 (OPB#1)
SIO#1 IRQ3 = Canister 0, PCI board 1
SIO#1 IRQ4 = Canister 0, PCI board 2
SIO#1 IRQ5 = Canister 0, PCI board 3
SIO#1 IRQ6 = Canister 0, PCI board 4
SIO#1 IRQ9 = Canister 1, PCI board 1
SIO#1 IRQ10 = Canister 1, PCI board 2
SIO#1 IRQ11 = Canister 1, PCI board 3
SIO#1 IRQ12 = Canister 1, PCI board 4

****For Back Plane PCI Bus 3 (OPB#2)
SIO#2 IRQ3 = Canister #2, PCI board 1
SIO#2 IRQ4 = Canister #2, PCI board 2
SIO#2 IRQ5 = Canister #2, PCI board 3
SIO#2 IRQ6 = Canister #2, PCI board 4
SIO#2 IRQ9 = Canister #3, PCI board 1
SIO#2 IRQ10 = Canister #3, PCI board 2

Back Plane Board Specifications

Preliminary | Ver 0.08 | NetFRAME Confidential

SIO#2 IRQ11 = Canister #3, PCI board 3
        SIO#2 IRQ12 = Canister #3, PCI board 4

1.6.2 The eight (8) Interrupt lines from the 2 I/O Canister card are also "OR"ed together to produce an active low interrupt to the mother board SIO chip. (one per PCI bus :P2_INTZ, P3_INTZ).

1.6.3 Each SIO chip is a PCI bus arbiter for one of the two PCI busses.
    ****For Back Plane PCI Bus 2 (OPB#1)
    REQ0/GNT0 = OPB #1
    REQ1/GNT1 = Bridge #1 Canister Address 0
    REQ2/GNT2 = Bridge #2 Canister Address 1
    REQ3/GNT3 = Not used
    REQ4/GNT4 = Not used
    ****For Back Plane PCI Bus 3 (OPB#2)
    REQ0/GNT0 = OPB #2
    REQ1/GNT1 = Bridge #1 Canister Address 2
    REQ2/GNT2 = Bridge #2 Canister Address 3
    REQ3/GNT3 = Not used
    REQ4/GNT4 = Not used 1.6.4 The Memory control lines from the OPBs are connected to the SIO (FlashReq, MemReq and MemAck)

1.6.5 The SIO chip does not use the following:
    - The ISA Bus
    - IRQs 1,2,7,8,13,14,15
    - The Built in PCI Interrupts 1.6.6 All unused inputs and I/O pins are pulled to a non intrusive state.

1.7 Chassis Manager (CDM)

1.7.1 There will be two PIC Chips (1-PIC16C74 and 1-PIC16C65) on the backplane handling the following functions:
- monitor Canister SN/Present lines that are used to determine which of the Canister slots are filled and what is the serial number of that canister.
- monitor and control the system Power
  – Power Supply SN/Present
  – Power Supply On/Off
- monitor the DC voltage levels
- monitor the temperature at points around the system
- read and write system messages to Non Volatile RAM ("Flight Data Recorder"

NOTE:    PIC chips are to be powered from an independent BIAS +5v coming from the Power Supply.

Back Plane Board Specifications

Preliminary            Ver 0.08            NetFRAME Confidential

2.0 Raptor Extended Back Plane (Proposed)

2.1 Main Board Features

- Connectors for 1 Mother Bd (2-32 bit PCI connectors & side band signals & Power)
- Connectors for 3 Hot Swappable Power Supplies
- Eight (8) PCI to PCI Bridge chips
- Two SIO chips connected to the APIC bus and PCI busses
- Connectors for eight (8) I/O Canister Bds (-each includes- 1-32 bit PCI connectors & side band signals & Power)
- Chassis Controller circuitry using CDM Network Chips
- Chassis Controller circuitry using CDM/Wire Service Network Chips
- Test Connectors to bring out certain debugging signals- Two SIO chips connected to the APIC bus and PCI busses to handle PCI arbitration and interrupts
- Test Connectors to bring out certain debugging signals

NOTE: All the PCB connectors on the Extended Back Plane are to be FEMALE pin connectors.

2.2 Mother Board Connectors 2.2.1 The Mother Board drives two separate PCI busses. These two are 32 bit PCI busses.

2.2.2 Connector space for the side band, power lines and spares is also provided. *******These lines are defined in the connector signal table at the end of this document.

2.3 Back Plane PCI Busses 2.3.1 The Back Plane contains two (2) independant PCI busses (PCI Bus #2 and PCI Bus #3)

2.3.2 Each PCI bus consists of one (1) OPB chip on the Mother Board, one (1) SIO chip on the Back Plane, and four (4) DEC PCI to PCI bridge chips on the Back Plane.

2.3.3 Each PCI bus has the same numbering scheme for devices connected to it.
- OPB IDSEL = 0 (on Mother Board)
- SIO IDSEL = 1

**** Bridge chips are numbered from the top down
- 1st Bridge Chip IDSEL = 2
- 2nd Bridge Chip IDSEL = 3
- 3rd Bridge Chip IDSEL = 4
- 4th Bridge Chip IDSEL = 5

2.3.4 Each OPB on the Mother Board outputs a PCI Clock. The two PCI Clocks that go to the Back Plane PCI Busses are buffered and distributed.

Back Plane Board Specifications
Preliminary                         Ver 0.08                         NetFRAME Confidential

2.4 PCI to PCI Bridge Chips
2.4.1 The Back Plane Board has eight (8) DEC 21152 Bridge chips on it. The Primary side of the chips is connected to one of the two PCI busses running from the Mother Board OPB chips. (4 chips on PCI #2 and 4 chips on PCI #3)

2.4.2 The secondary side of the bridge chips is connected to one of the eight canister board connectors

2.5 PCI Canister Board Connectors
2.5.1 Each of the 8 PCI Canister Board Connectors contains a single 32 bit PCI bus.

2.5.2 Hot inserting of these boards is desirable. By controlling FETs on the Canister boards with a CDM chip, this is accomplished by turning on the power to each PCI slot in sequence.

2.5.3 Each of the two PCI busses goes to only 4 of the 8 PCI Canister Board slots. Each PCI bus connects to each PCI Canister Board slot on one side of the Back Plane. (the 4 slots on the right side or the 4 slots on the left side)

2.5.4 Connector space for the side band, power lines and spares will also be provided. *******These lines are defined in the connector signal table at the end of this document.

2.6 SIO Chip
2.6.1 The SIO chip uses the following of its functions:
- The APIC Bus
- IRQs 3,4,5,6,9,10,11,12
- The PCI Arbiter
- The PCI Bus 2.6.3 The four Interrupt lines from each I/O Canister card (1 per PCI slot) will be routed to one of the two SIO chips on the Back Plane. Each SIO Chip will be used as an interrupt controller for one of the PCI busses and be connected to the Mother Board APIC bus. The 16 interupts on each PCI Bus will be wire ORed to get only 8 interupts going to the SIO chip.

****For Back Plane PCI Bus 2 (OPB#1)
SIO#1 IRQ3 = Canister #0, PCI board 1 & Canister #4, PCI board 1
SIO#1 IRQ4 = Canister #0, PCI board 2 & Canister #4, PCI board 2
SIO#1 IRQ5 = Canister #0, PCI board 3 & Canister #4, PCI board 3
SIO#1 IRQ6 = Canister #0, PCI board 4 & Canister #4, PCI board 4
SIO#1 IRQ9 = Canister #1, PCI board 1 & Canister #5, PCI board 1
SIO#1 IRQ10 = Canister #1, PCI board 2 & Canister #5, PCI board 2
SIO#1 IRQ11 = Canister #1, PCI board 3 & Canister #5, PCI board 3
SIO#1 IRQ12 = Canister #1, PCI board 4 & Canister #5, PCI board 4

Raptor Hardware Spec.           Page 5 of 10           4/19/96

Back Plane Board Specifications
Preliminary        Ver 0.08        NetFRAME Confidential

****For Back Plane PCI Bus 3 (OPB#2)
SIO#2 IRQ3 = Canister #2, PCI board 1 & Canister #6, PCI board 1
SIO#2 IRQ4 = Canister #2, PCI board 2 & Canister #6, PCI board 2
SIO#2 IRQ5 = Canister #2, PCI board 3 & Canister #6, PCI board 3
SIO#2 IRQ6 = Canister #2, PCI board 4 & Canister #6, PCI board 4
SIO#2 IRQ9 = Canister #3, PCI board 1 & Canister #7, PCI board 1
SIO#2 IRQ10 = Canister #3, PCI board 2 & Canister #7, PCI board 2
SIO#2 IRQ11 = Canister #3, PCI board 3 & Canister #7, PCI board 3
SIO#2 IRQ12 = Canister #3, PCI board 4 & Canister #7, PCI board 4

2.6.2 The sixteen (16) Interrupt lines from the 2 I/O Canister card are also "OR"ed together to produce an active low interrupt to the mother board SIO chip. (one per PCI bus :P2_INTZ, P3_INTZ).

2.6.3 Each SIO chip is a PCI bus arbiter for one of the two PCI busses.
****For Back Plane PCI Bus 2 (OPB#1)
REQ0/GNT0 = OPB #1
REQ1/GNT1 = Bridge #1 Canister Address 0
REQ2/GNT2 = Bridge #2 Canister Address 1
REQ3/GNT3 = Bridge #3 Canister Address 4
REQ4/GNT4 = Bridge #4 Canister Address 5
****For Back Plane PCI Bus 3 (OPB#2)
REQ0/GNT0 = OPB #2
REQ1/GNT1 = Bridge #1 Canister Address 2
REQ2/GNT2 = Bridge #2 Canister Address 3
REQ3/GNT3 = Bridge #1 Canister Address 6
REQ4/GNT4 = Bridge #1 Canister Address 7

2.6.4 The Memory control lines from the OPBs are connected to the SIO (FlashReq, MemReq and MemAck)

2.6.5 The SIO chip does not use the following:
- The ISA Bus
- IRQs 1,2,7,8,13,14,15
- The Built in PCI Interrupts 2.6.6 All unused inputs and I/O pins are pulled to a non intrusive state.

2.7 Chassis Manager (CDM)

2.7.1 There will be two PIC Chips (1-PIC16C74 and 1-PIC16C65) on the backplane handling the following functions:
- monitor Canister SN/Present lines that are used to determine which of the Canister slots are filled and what is the serial number of that canister.
- monitor and control the system Power
  -- Power Supply SN/Present
  -- Power Supply On/Off
- monitor the DC voltage levels
- monitor the temperature at points around the system

Back Plane Board Specifications

Preliminary  Ver 0.08  NetFRAME Confidential

- read and write system messages to Non Volatile RAM ("Flight Data Recorder"

NOTE: PIC chips are to be powered from an independent BIAS +5v coming from the Power Supply.

Back Plane Board Specifications

Preliminary  Ver 0.08  NetFRAME Confidential

3.0 CONNECTOR SIGNAL TABLE

3.1 PCI/Sideband/Clock Connector Lines — Pin Count
3.1.1 Mother Board PCI/Sidebands/CLKs (2 segments=360 pins)

| Signal Name | Pin Count | NOTES |
|---|---|---|
| JTAG () | 4 | TDO,TDI,Trst,TCK |
| JTAG TMS | 1 | |
| CDM Bus | 2 | CDM_SDA, CDM_SCL |
| Temperature Sensor Bus | 4 | TMP_SDA, TMP_SCL |
| APIC CLK | 1 | |
| APIC BUS DATA | 2 | Apic D0 & D1 |
| Power Switch | 1 | |
| AC Power Supply DC OK | 1 | |
| | 0 | |
| PCI CLK in | 2 | One per PCI Bus |
| PCI CLK out | 2 | One per PCI Bus |
| PCI Data | 64 | 32 bits per PCI Bus |
| PCI CBEz | 8 | 4 bits per PCI Bus |
| PCI Control | 20 | 10 bits per PCI Bus |
| PCI REQ/GNT | 4 | 2 bits per PCI Bus |
| Interrupts | 2 | 1 bit per PCI Bus |
| SIO Memory Control lines | 6 | 3 bits per PCI Bus |
| | 0 | |
| VCC5 | 24 | |
| Vcc3.3 | 26 | |
| VCC12p | 4 | |
| VDD12n | 2 | |
| GND | 165 | |
| CDM Power | 2 | Bias +5v |
| | 0 | |
| Spares | 13 | |
| | 0 | |
| TOTAL PINS Required | 360 | |

Back Plane Board Specifications

Preliminary                Ver 0.08               NetFRAME Confidential

3.1.2 Canister Board Sidebands + CLKs + Spares (1 segment=180 pins)

| Signal Name | Pin Count | NOTES |
|---|---|---|
| JTAG () | 4 | TDO,TDI,Trst,TCK |
| JTAG TMS | 1 | |
| CDM Bus | 2 | CDM_SDA, CDM_SCL |
| Canister PRESENT | 1 | |
| Canister Address | 3 | 0-4 small BP; 0-8 large BP |
| | 0 | |
| PCI CLK | 4 | 1 bit per card slot |
| PCI Data | 32 | 32 bits per PCI Bus |
| PCI CBEz | 4 | 4 bits per PCI Bus |
| PCI Control | 10 | 10 bits per PCI Bus |
| PCI Card Interrupts | 4 | 1 bit per card slot |
| PCI REQ/GNT | 8 | 2 bits per card slot |
| | 0 | |
| VCC5 | 18 | |
| VCC12p | 3 | |
| VDD12n | 1 | |
| GND | 82 | |
| Bridge 5/3.3 select | 1 | S_VIO to the bridge chip |
| | 0 | |
| Spares | 2 | |
| | 0 | |
| TOTAL Pins | 180 | |

Back Plane Board Specifications
Preliminary                  Ver 0.08                  NetFRAME Confidential
4.0 Diagrams
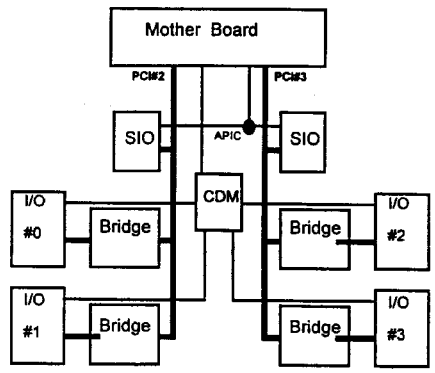
Basic Backplane
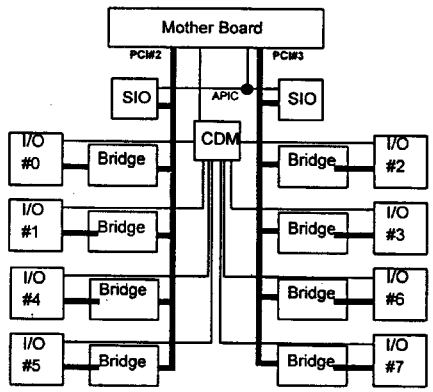
Extended Backplane
Raptor Hardware Spec.          4/19/96

I/O Canister Assembly Specifications

Preliminary　　　　　　　　　　Ver 0.06　　　　　　　　NetFRAME Confidential

1.0 I/O Card Canister Assembly
　　13-000066-01　　I/O Canister Board
　　13-000070-01　　Active PCI Bus Extension Board
　　13-000071-01　　Passive PCI Bus Extension Board
　　13-0000xx-01　　I/O Server 4 (Future Product)

1.1 Main Assembly Features
- I/O Canister Board contains mostly passive components
- A PIC16C65 Chip to control several on-board Raptor System functions
- Four (4) slots for add-on PCI cards (no PMC at this time)
- One (1) slot dedicated to one of the following
  - Passive Extender Board
  - Active Extender Board
  - IOP4 Board (when available)
- OEM Boards for many standard interfaces will be qualified
- All PCI board control will be handled by main server processors (non-IOP4 unit)
- Entire I/O Card Canister Assembly can be hot swapped/added (Needs SW Support)
- Each I/O Card Canister Assembly will have redundant fans directly attached.

1.2 IOP4/PCI Bus Extension Slot
1.2.1　One dedicated slot on the I/O Canister Board will be for either the IOP4 (future) or one of the PCI Bus Extension Boards 1.2.2　The PCI Bus Extension Boards will be signal jumping boards through which all PCI Data/Control/Interrupt signals will be routed. This is so that there will be a way to break the PCI Bus path when the IOP4 board is used. (remove jumper Bd.) This then allows the IOP4 to have local control the PCI bus to the OEM PCI cards.

1.2.3　Both PCI Bus Extension Boards will have two LEDs extending through its EMI Shield. One yellow LED indicating a fan fault in the on Canister Fans and one Yellow/Green LED to indicate a FRU failure and that it is "safe" to remove the canister 1.2.4　The Passive PCI Bus Extension Board (13-000071-01)
　　　　1.2.4.1　This board will be a simple pass through board in which all PCI signals are connected from the Back Plane to the PCI card slots.
　　　　1.2.4.2　This is the preferred board from a cost and manufacturability standpoint.

1.2.5　The Active PCI Bus Extension Board (13-000070-01)
　　　　1.2.5.1　This board will have a DEC PCI to PCI Bridge chip on it to buffer and forward the PCI Bus signals.

I/O Canister Assembly Specifications

Preliminary　　　　　　　　　　Ver 0.06　　　　　　　　NetFRAME Confidential 1.2.5.2 There will be a 5v to 3.3v Linear regulator on the Active PCI Bus Extension Board to produce local power for the Bridge chip 1.2.5.3 The DEC Bridge IDSEL = 2

1.2.5.4 Only one of the four possible REQ, GNT and CLK signals coming from the back Plane will be used by the DEC chip (REQ0, GNT0 and CLK0)

1.2.5.5 This board will be used only if it is determined that the PCI bus lengths of the Passive PCI Bus Extension Board are too long for reliable signal integrity.)

1.3 PCI Signal Handling

1.3.1 Each add on card on the PCI bus will have its IDSEL line mapped to a different primary device number (Slot 1 = 4, Slot 2 = 5, Slot 3 = 6, Slot 4 = 7)

1.3.2 All PCI Signals will be routed through the PCI Bus Extension Board (Active or Passive) so that they can be intercepted by the future IOP4 Board for local handling.

1.4 PCI Interrupt Handling

1.4.1 On each individual PCI slot all four PCI interrupts will be connected separately to the PCI Extender Board Slot (16 INTs - 4x4). On the PCI Extender Board, all the interrupts from each single board will be wired together to form four interrupts for the entire I/O Canister Assembly. (Slot#1 INTz-A,B,C,D = INTZ_S0 ; Slot#2: INTz-A,B,C,D = INTZ_S1; etc.) The four resultant interrupt lines will be routed to the Back Plane through the PCI Bus Extension Board and the Back Plane connector.

1.4.2 The 16 PCI Board interrupts can be swapped around on the PCI Bus Extension Boards to yield just about any combination of interrupts. This is done by making cuts and adding header blocks to the existing hole patterns. These will be used the software group to determine the optimum interrupt configuration for initial bring-up ONLY. The production boards will all be connected in the pattern that the software group approves.

1.5 Board Capacity

1.5.1 The PCI form factor board will handle up to four (4) of the long PC PCI (12.3") form factor cards.

1.5.2 All of the PCI OEM add on boards will be either +5v signal level PMC/PCI cards or UNIVERSAL PMC/PCI cards (at this time)

1.6 OEM Boards that will be qualified to run with the bridge board and our system will include the following:

1.6.1 SCSI Controller 1.6.2 Ultra SCSI Controller 1.6.3 Ethernet NIC (10Mbps)

1.6.4 Fast Ethernet NIC (100Mbps)

I/O Canister Assembly Specifications
Preliminary              Ver 0.06            NetFRAME Confidential 1.6.5  Token Ring NIC (4/16Mbps)
    1.6.6  FDDI NIC
    1.6.7  Fibre Channel NIC
    1.6.6  ATM NIC

1.7 All board control will be handled by main server processors.
    1.7.1  Until the IOP4 is available, there is no PCI controlling circuitry on the canister board itself. The system processors must therefore control all data transfers to and between the OEM plug in cards.

1.8 Misc.
    1.8.1  Power Management for the Hot swap will be handled by having FET switches selectively turn power to the canister board on. (Controlled by the on-board CDM/Wire Service)
    -Each PCI card slot has an individual +5v FET Switch (cycled on one at a time)
    -all +12v &-12v on one switch
    1.7.2  Each PCI Canister Board has on it a one time programmable series prom for holding the serial number of the board. This PROM will be read by the CDM/Wire Service system on the Back Plane and used to determine weather or not a canister is plugged into any particular Canister Connector. (Canister present)
    1.7.2  Provisions have been left for a serial number prom to be placed on the IOP4 to be read by the CDM/Wire Service system on the Canister Board.

1.8 CDM/Wire Service Bus
    1.8.1  A PIC16C65 Chip will be used for the following functions:
- monitor PRSNT lines from each canister to determine which of the PCI Slots on each Canister are filled.
- monitor Canister Address lines to determine which Back Plane slot the canister is plugged into.
- control the Power to each PCI slot
- control the JTAG TMS line to the IOP4.
- control I/O NMI line to the IOP4.
- read the serial number PROM on the IOP4
- potentially control power on the IOP4.
- potentially determine what type of IOP is plugged into the dedicated slot
- control the FRU Fault LED on EMI Panel of each canister
- control the Fan Fault LED. on EMI Panel of each canister
- monitor the speed of the on canister fans.
- control the high/low speed line of the on canister fans.

NOTE:    PIC16C65 chips are to be powered from the main +5v coming from the system back plane.

Mother Board
Draft of
Architecture and Technology

Rev 3.0
30 September 95

1.0 Components 1.1 CPU

The CPU board will support between 1 and 4 P6 CPU's, using an integrated 512K L2 cache. Each CPU will run at the same bus to core speed ratio. Faster processors may be mixed with slower processors however the faster processors must run at the same bus to core speed ratio, which would then negate the effect of their faster speed. The bus to core ratio circuit is changeable under software control from the internal CDM system. The target processor speed is 166 Mhz internal, however it will support processors of other speeds.

1.2 Chipset

The CPU board will use the Intel 450GX Orion chipset. There will be one memory controller on the CPU board using the OMCDP and the OMCDC. These are a Data Path Control and a Memory Controller respectively. There will be three OPB P6 to PCI bridges. Two PCI buses will route off the board to standard PCI to PCI bridges. One PCI bus will remain resident on the board and bridge to ISA.

1.3 Memory 1.3.1 Memory Type

The CPU board will use 3.3v DIMMS. These will be JEDEC ECC standard pinout. Rev 1 and Rev 4 CPU boards will only support single bank DIMMS, Rev 5 CPU board will suport single or dual bank DIMMS. Refresh rate is not an issue as we use CAS before RAS refresh. The memory controller will also support mixed density DIMMs across different banks, but not within any one bank. Software will read a the DIMM type through the CDM bus.

1.3.2 Memory Banks

There will be 16 physical DIMM sockets on the CPU board. These will accept any standard DIMM module as specified above. Therefore each socket will support one ROW of memory. Four DIMMs will be required to complete one bank of memory. There will be a maximum of 8 banks of DIMMs for the CPU board, contained with in 4 multiplexed banks.

1.3.3 Memory Capacity

The maximum amount of memory supportable by the ORION chipset is 4 GigaBytes. The maximum amount of memory the CPU board can support using currently available DIMMs is 2GB. This 2 GB is obtainable using 16M x 72 DIMMs (128 MB). Next generation DIMMs using 64Mbit technology DRAM chipsor dual bank DIMMS will allow the CPU board to be populated to a maximum of 4GB using 256 MB modules.

1.3.4 ECC Coverage

Each 72 bit word has 18 bits located in each of the 4 DIMMS that make up the memory banks. Using this strategy, each 72 bit read from the DIMM's will be single bit correctable and double bit detectable. Each DIMM will be protected by 4 bit ECC, which allows for a failure of any x4 DRAM chip component on the DIMM without producing errors in memory. Using DIMMS with x4 chips

2.0 PCI Buses & I/O Subsytem

The CPU board will support 3 PCI buses. These will be 32 bit buses. The bus speed will be 33 Mhz. The arrangement of the bus loads is detailed in the Backplane and I/O board specification. The arrangement of these loads will not violate any drive specification of the OPB or PCI specification.

The ISA I/O subsystem will be located on the CPU board. This is covered in a separate specification.

3.0 Clocks 3.1 CPU Clocks

The CPU board will derive its clocks from an on board oscillator. This oscillator will drive a TI clock buffer which is not a PLL. The tolerance achievable by ganging the outputs together of this driver are tighter than a PLL. The bus clock speed will be 66 Mhz. All clock traces on the board will be in inner layers and will be of equal lengths.

3.2 PCI Clocks

The CPU board will supply a single PCI clock to the backplane. The backplane will have the clock driver chip that will distribute PCI clks to all slots on the backplane. The CPU board will receive 2 of these PCI clks, one for each OPB that drives the PCI buses for the backplane.

The PCI bus resident on the motherboard will have its own clock driver and supply the resident PCI loads from that source.

3.3 APIC Clocks

The APIC CLK will be input from the backplane. The CPU board will receive, not generate this clk. This must be a 3.3v level.

4.0 Monitoring Devices

The CPU board will contain a CDM bus chip to monitor temperature behind the P6 processors. It will also sample the IERR lines from the processor for indication of internal processor error. It will also sample the THERMTRIP output from the processors. These are open collector signals from the processor, which will be read seperately by the CDM bus to identify the faulted processor.

5.0 Backplane Interface.

The CPU board will interface with the backplane with the following signals:

5.1 Signal      OPB PCI Bus #2

|           | OPB PCI Bus #3 |
|-----------|----------------|
| 5.2 Clocks | PCI Bus Clocks for all PCI buses #2 , #3<br>APICCLK |
| 5.3 Sideband | APIC Data Lines<br>Power |

6.0 Power

6.1 5v

The OPB 5 volt supply shall be sourced from the backplane.

6.2 Processor Core Power 2.1v-3.3v

The processor core will receive power from a separate DC to DC converter specified specifically for use with P6 processors. Each P6 will have its own DC-DC converter. No P6 will share a processor core power plane with any other P6. The core power plane will have additional bypassing in the form of 5 33uf low ESR tantalum capacitors. The primary input for these power modules shall be the 5 volt supply. Additionally these supplies may require a small amount of +12 for bias. Each of the modules will be socketed to allow for easy replacement and Intel Overdrive Upgrade compatibility.

6.3 3.3v

The CPU L2 , Orion Chipset, Memory, Clocks and other buffers and gates uses 3.3 volts. This will be sourced from the backplane.

6.4 Vterm Termination Power 1.5v

Power for the P6 bus terminators shall be produced by two separate Linear regulators, one each located at each physical end of the P6 bus. Power to the regulators shall be from the general 3.3 volt supply (not processor core). Both the input and outputs of the regulators require additional bypassing.

6.5 Vref GTL Reference Voltage 1.0v

The GTL reference voltage is generated from the Vterm power using a simple resistor divider network.

6.6 GND

The GND signals shall be distributed across two rows of the targeted connector. These rows shall be placed such that they separate the three signals rows.

6.7 12v 12 v will be source from the backplane board.

7.0 Connector

7.1 Signal

The CPU board Connector shall be a Robinson Nugent Meta Pack 2 connector or equivalent. It will consist of 5 rows. Three rows will be dedicated for signals and two rows for ground. The connector shall be a female type on the CPU board, mating to a male header on the backplane board. It is not necessary to make this CPU board hot swappable as it is the only CPU board in the system. Therefore all pins for the CPU board mating connector on the backplane may be all the same length. Any other second source connector will have parasitic and transmission line specifications equal to or exceeding the specified connector.

At the time of this specfication the connector assignment for both signal and power are under review.

Raptor Hardware Specification    Rev 0.9    5/6/97

Mother Board SIO and Peripheral Logic (SPL)

Introduction

This document defines the next generation NetFRAME machine's SIO and Peripheral Logic (SPL) located on the Mother Board (MB). In order to allow the next generation machine to run off the shelf OSs, the machine will include standard PC Peripherals and Ports. This will allow this machine to even boot DOS from a Floppy.

PCI Bus 1 from the MB will be used exclusively by the SPL. An Adaptec SCSI Controller chip will be attached to the PCI Bus to create a SCSI interface for the optional CD-ROMs and optional Hard Disks. A Cirrus Logic SVGA Video Controller chip also will attach to the PCI Bus.

An ISA Bus will be created by an Intel System I/O-APIC (SIO.A - 82379AB) chip on the SPL. This chip is a PCI to ISA Bridge chip and also contains a PCI Bus Arbiter, an Interrupt Controller and a Speaker Driver. The SMC Super I/O chip will be attached to this ISA Bus to create a Floppy Disk interface, two Serial interfaces and a Parallel interface. An Intel 82C42 chip will also attach to the ISA Bus and will create the PS2 style Keyboard and PS2 style Mouse interfaces. The Dallas Real Time Clock (RTC) will attach to the ISA Bus. The Intel BIOS Flash Memory will attach to the ISA Bus.

The SPL will connect to the Wire Service (WS) Bus with a PIC16C65 chip manufactured by Microchip and two 1Kx9 FIFOs connected to the ISA Bus. The SPL will also contain other miscellaneous logic.

SCSI (CD-ROM & Hard Disks) Port

The SCSI Port is generated by an Adaptec AIC-7870 PCI Fast Wide SCSI-2 Controller chip and is used for optional CD-ROMs and optional Hard Disks. The CD-ROMs and Hard Disks will mount outside of the main chassis. BIOS can boot either through the MB SCSI Port or a SCSI Port created by a PCI SCSI card plugged into an I/O Canister. The SCSI Port 68-pin connector is on the MB EMI shield in the front of the machine.

Floppy Disk Port

The Floppy Disk Port from the SMC FDC37C665GT Super I/O chip is used by the 3.5" 1.44MB Floppy Disk which mounts onto the MB (with a very short signal ribbon cable and power cable. The TEAC FD-235HF-7240 Floppy Disk will be used.

Parallel Port

The Parallel Port from the SMC FDC37C665GT Super I/O chip allows one or more Parallel devices (Printer, Debugger, ...) to plug into the system. The Parallel Port Tin-plated Dimpled Sub-D connector is on the MB EMI shield in the front of the machine and uses a standard Female DB25 connector.

Serial Ports

The two Serial Ports from the SMC FDC37C665GT Super I/O chip allows two Serial devices (Modem, Debugger, UPS, ...) to plug into the system. The Serial Port Tin-plated Dimpled Sub-D connectors are on the MB EMI shield in the front of the machine and use standard Male DB9 connectors. Two Linear Technology LT1133s will drive the signals to/from RS-232 levels. One Serial Port will probably be used by the UPS.

Raptor Hardware Specification    Rev 0.9    5/6/97

WS Bus

The SIO.A chip ISA Bus connects to the WS PIC16C65 chip manufactured by Microchip used to create the WS Bus and two 1Kx9 FIFOs. The ISA Bus is used to allow the P6s to communicate on the WS Bus.

WS Bus External Port

The Philips 82B715 I2C Bus Extender chip will create the WS External Port to talk with the outside world for remote operations. The WS External Port connector is on the MB EMI shield in the front of the machine and uses a standard RJ45 8-pin connector.

Mouse Port

The Mouse Port from the Intel 82C42 chip uses a PS2 style Mini DIN connector. The Mouse Port is on the MB EMI shield in the front of the machine.

Keyboard Port

The Keyboard Port from the Intel 82C42 chip uses a PS2 style Mini DIN connector. The Gated A20 logic is also implemented along with the Port 92 logic. The Keyboard Port is on the MB EMI shield in the front of the machine.

Video Port

The Video Port from the Cirrus Logic CL-5436 chip allows one SVGA Monitor to plug into the system with a standard SVGA/DB15 connector. The Video controller chip will hang off the PCI Bus and will support 1024x768 mode with 256 colors. 1MB of Video RAM (DRAM) will be included in the system. This is NOT upgradeable. The Video Port is on the MB EMI shield in the front of the machine.

RTC

The RTC will be implemented using a Dallas DS12887A part which will hang off of the ISA Bus. This part has a 10 year minimum life.

Flash/BIOS

The Intel PA28F400BXT120 Flash/BIOS will be 512KB accessed 512Kx8 with 128KB allocated for the BIOS located at 000E0000:000FFFFF, FFEE0000:FFEFFFFF and FFFE0000:FFFFFFFF and 384KB allocated for Extended BIOS located at FFF80000:FFFDFFFF and will hang off the ISA Bus. There will be a button (and LED) for "Upload FLASH Enable" which will be input to (output from) a MB WS chip. Writing the BIOS areas will be controlled by this WS chip with input from the Flash Upload button. There is no parity on BIOS memory since there is no parity on the ISA Bus so software should disable shadowing before writing, write, then do a read after write always to verify that the data is written correctly. Since the BIOS memory is implemented in FLASH, it should not be susceptible to alpha particles so it is less likely that the location will go bad some time after the data is written. After the data is written, it is OK to re-enable shadowing of BIOS Memory. The Flash chip may be socketed.

Interrupts

The Interrupts will be routed by the SIO chip on the MB and two SIO chips on the Back Plane (BP). The MB SIO chip will handle the interrupts from all the PC compatibility devices as well as bundled PCI Interrupt for each BP PCI Bus. All PCI Interrupts from the 8 PCI slots on each PCI bus will be Raptor Hardware Specification   Rev 0.9                                    5/6/97
wired together and routed to     SPL. The 3-wire APIC Bus runs b.  een the SIO chips and the P6s.
Here is a Diagram of the 3 PCI Busses in the system:

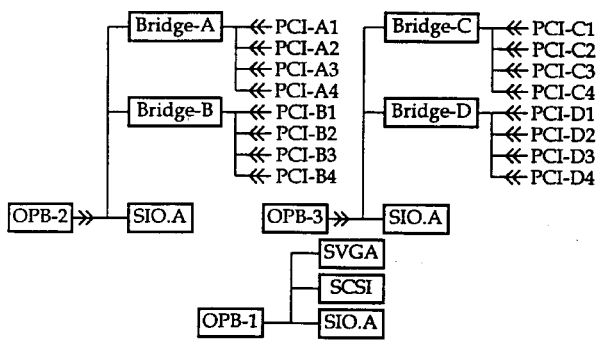

Here is a list of the PC Compatible IRQs and how they are allocated:

| IRQ | Use |
|---|---|
| 0 | Timer 1 Counter 0 (3 μsec) |
| 1 | PS2 Keyboard |
| 2 | Cascade from Slave |
| 3 | Com2 - Serial Port 2 |
| 4 | Com1 - Serial Port 1 |
| 5 | LPT1 - Parallel Port (alternate) |
| 6 | Floppy Disk |
| 7 | LPT1 - Parallel Port |
| 8 | RTC |
| 9 | PCI SVGA Video |
| 10 | PCI Bus 2 |
| 11 | PCI Bus 3 |
| 12 | PS2 Mouse |
| 13 | FERRz from P6 Coprocessors |
| 14 | PCI SCSI |
| 15 | WS |

It is under BIOS control how the PCI Bus Interrupts are routed. The PCI Bus Interrupts can either be routed to the MB SIO chip on IRQ 10 & 11 or routed to the BP SIO chips on IRQs 3, 4, 5, 6, 9, 10, 11 & 12.

PCI interrupts must be programmed Level sensitive, not Edge sensitive. This is because several PCI devices can present interrupts at the same time on the same line. Once one interrupt is sensed and serviced, that interrupt will be cleared. If there is another device on that line then the interrupt line will stay active until all interrupts on that line are serviced and cleared.

Speaker Port

The Speaker Port is created by the Intel SIO.A chip and allows a speaker to be attached to the system. The speaker attaches to the CPU Chassis and plugs in to the MB via a cable. The SIO.A chip Speaker Port has a maximum drive of 24mA.

LCD Screen

The LCD screen attaches to Front Bezel and plugs in to the MB via a cable. The LCD is driven by the PIC16C65 chip which is attached to the WS Bus.

Raptor Hardware Specification    Rev 0.9    5/6/97
Power ON and OFF Circuit, ̤set and NMI Buttons, LEDs

Along with the "Upload FLASH Enable" button, there are several other buttons. The Power On/Off button goes to the Back Plane. The NMI and Reset buttons are ORed together with the NMI and Reset WS signals and the NMI and Reset signals from the SIO chip and Keyboard Controller. They are sent to the P6s. All the buttons attach to the MB along with the LEDs.

Besides the Upload Flash Enable LED(Green), there is the MB Status LED(Green/Amber), System Fault LED(Amber), System Temperature Fault LED(Amber) and the MB Fan Failed LED(Amber).

Signal Count

Here is a list of all the signals needed to implement the SPL that go out the Back Plane:

| Signal | Type | Count |
|---|---|---|
| PCI INTz A:B | In | 2 |
| APICCLK | In | 1 |
| APICD0:1 | Bi | 2 |
| WS CLK | In | 1 |
| WS DATA | Bi | 1 |
| WS 5Vdc | In | 1 |
| Switched 5V | In | 3 |
| Total | | 11 |

Raptor Hardware Specificatic     Rev 0.9                                              5/6/97

Component List

| Component | Manufacturer P/N | NetFRAME | Quantity | Unit Power | Total Power | Unit Cost | Total Cost |
|---|---|---|---|---|---|---|---|
| SIO.A | Intel S82379AB | 56-260018-01 | 1 | 2.5 | 2.5 | 32.50 | 32.50 |
| Super I/O | SMC FDC37C665GT | 56-260021-01 | 1 | 0.260 | .260 | 8.00 | 8.00 |
| Keyboard Controller | Intel 82C42 | 56-260020-01 | 1 | 1.5 | 1.5 | 11.65 | 11.65 |
| WS Support | Microchip PIC16C65 | 57-000026-01 | 3 | 1.0 | 3 | 5.25 | 15.75 |
| PIC16C65 4MHz Crystal | Ecliptec | 69-000031-01 | 3 | 0 | 0 | 1.00 | 3.00 |
| Socket for PIC16C65 | | 20-200033-04 | 3 | 0 | 0 | 1.87 | 5.61 |
| 1K 8-bit FIFO | TI SN74ACT7202 | 51-200001-01 | 2 | .3 | .6 | 2.30 | 4.60 |
| I2C Bus Extender | Philips P82B715TD | 56-250026-01 | 1 | 0.3 | .3 | 3.25 | 3.25 |
| PCI SCSI Controller | Adaptec AIC-7870 | 56-260023-01 | 1 | 1.2 | 1.2 | 45.00 | 45.00 |
| PCI SVGA Controller | Cirrus Logic CL-5436 | 56-260022-01 | 1 | 2 | 2 | 18.00 | 18.00 |
| 1MB Video DRAM | Micron 256Kx16 | 51-100006-01 | 2 | .825 | 1.65 | 16.75 | 33.50 |
| RTC | Dallas DS12887A | 56-260019-01 | 1 | .3 | .3 | 5.00 | 5.00 |
| Socket for RTC | | 20-200016-01 | 1 | 0 | 0 | .97 | .97 |
| 512K Flash | Intel PA28F400BXT120 | 52-000015-01 | 1 | .4 | .4 | 16.35 | 16.35 |
| Socket for Flash | Yamaichi IC179-44600-500 | | 1 | 0 | 0 | 5.89 | 5.89 |
| RS-232 Driver/Receiver | LT 1133A | | 2 | .4 | .8 | 2.20 | 4.40 |
| LCD | EDT | 66-000012-01 | 1 | .405 | .405 | 22.60 | 22.60 |
| LCD Cable | 14-pin cable+keyed connector | | 1 | 0 | 0 | 1.50 | 1.50 |
| LCD Connector | 14-pin Male keyed connector | | 1 | 0 | 0 | .79 | .79 |
| Speaker | Quam | 39-00????-?? | 1 | 3 | 3 | 2.39 | 2.39 |
| Speaker Cable | 2-pin cable+keyed connector | | 1 | 0 | 0 | .78 | .78 |
| Speaker Connector | 2-pin Male keyed connector | | 1 | 0 | 0 | .23 | .23 |
| Power On/Off Button | | | 1 | 0 | 0 | .53 | .53 |
| Pin Hole Button | | 23-000015-01 | 3 | 0 | 0 | .84 | 2.52 |
| Green/Yellow LED | | 66-000011-01 | 1 | .05 | .05 | 1.13 | 1.13 |
| Yellow LED | | | 3 | .05 | .15 | .71 | 2.13 |
| Green LED | | | 1 | .05 | .05 | .71 | .71 |
| Floppy Disk | TEAC FD-235 | | 1 | 2.1 | 3 | 25.00 | 25.00 |
| FD Signal Cable | 34-pin cable+keyed connector | | 1 | 0 | 0 | 2.77 | 2.77 |
| FD Power Cable | 4-pin Mini Molex | | 1 | 0 | 0 | 1.23 | 1.23 |
| Keyboard | | | 0 | .75 | .75 | 25.00 | 0 |
| Mouse | | | 0 | .5 | .5 | 15.00 | 0 |
| 68-pin SCSI Connector | AMP | 20-110071-01 | 1 | 0 | 0 | 4.23 | 4.23 |
| SCSI Cable | | | 0 | 0 | 0 | 77.00 | 0 |
| WS RJ45 Connector | | | 1 | 0 | 0 | 1.22 | 1.22 |
| Mini DIN Connector | AMP | 20-400062-01 | 2 | 0 | 0 | 1.95 | 3.90 |
| DB9 Connector | AMP | 20-100049-01 | 2 | 0 | 0 | 4.20 | 8.40 |
| Serial Cable | | | 0 | 0 | 0 | 6.00 | 0 |
| DB25 Connector | ITT Cannon | 20-110069-01 | 1 | 0 | 0 | 1.83 | 1.83 |
| Parallel Cable | | | 0 | 0 | 0 | 6.00 | 0 |
| SVGA DB15 Connector | ITT Cannon | 20-110068-01 | 1 | 0 | 0 | 1.60 | 1.60 |
| SVGA Video Cable | | | 0 | 0 | 0 | 13.00 | 0 |
| SVGA Monitor | | | 0 | 0 | 0 | 300.00 | 0 |
| Total Power & Cost | | | | | 22.415 | | 298.96 |

Back Plane Board Specifications

Preliminary          Ver 0.08          FRAME Confidential

1.0 Raptor Basic Back Plane

1.1 Main Board Features
- Connectors for 1 Mother Bd (2-32 bit PCI connectors & side band signals & Power)
- Connectors for 2 Hot Swappable Power Supplies
- Connectors for four (4) I/O Canister Bds (-each includes- 1-32 bit PCI connectors & side band signals & Power)
- Four PCI to PCI Bridge chips
- Two SIO chips connected to the APIC bus and PCI busses to handle PCI arbitration and interrupts
- Primary PCI Clock distribution chip on Back Plane
- Chassis Controller circuitry using CDM/Wire Service Network Chips
- Test Connectors to bring out certain debugging signals NOTE: All the PCB connectors on the Base Unit Back Plane are to be FEMALE pin connectors.

1.2 Mother Board Connectors
1.2.1 The Mother Board drives two separate PCI busses. These two are 32 bit PCI busses.
1.2.2 Connector space for the side band, power lines and spares is also provided. *******These lines are defined in the connector signal table at the end of this document.

1.3 Back Plane PCI Busses
1.3.1 The Back Plane contains two (2) independant PCI busses (PCI Bus #2 and PCI Bus #3)
1.3.2 Each PCI bus consists of one (1) OPB chip on the Mother Board, one (1) SIO chip on the Back Plane, and two (2) DEC PCI to PCI bridge chips on the Back Plane.
1.3.3 Each PCI bus has the same numbering scheme for devices connected to it.
- OPB IDSEL = 0 (on Mother Board)
- SIO IDSEL = 1
**** Bridge chips are numbered from the top down
- 1st Bridge Chip IDSEL = 2
- 2nd Bridge Chip IDSEL = 3
1.3.4 Each OPB on the Mother Board outputs a PCI Clock. The two PCI Clocks that go to the Back Plane PCI Busses are buffered and distributed by a 74FCT3805A chip. (dual 1 input,5 output) Each half of the chip handles one PCI bus.

1.4 PCI to PCI Bridge Chips
1.4.1 The Back Plane Board has four (4) DEC 21152 Bridge chips on it. The Primary side of the chips is connected to one of the two PCI busses

Back Plane Board Specifications
Preliminary          Ver 0.08          tFRAME Confidential running from the Mother Board OPB chips. (2 chips on PCI #2 and 2 chips on PCI #3)

1.4.2 The secondary side of the bridge chips is connected to one of the four canister board connectors

1.5 PCI Canister Board Connectors 1.5.1 Each of the 4 PCI Canister Board Connectors contains a single 32 bit PCI bus.

1.5.2 Hot inserting of these boards is desirable. By controlling FETs on the Canister boards with a CDM chip, this is accomplished by turning on the power to each PCI slot in sequence.

1.5.3 Each of the two PCI busses goes to only 2 of the 4 PCI Canister Board slots. Each PCI bus connects to each PCI Canister Board slot on one side of the Back Plane. (the 2 slots on the right side or the 2 slots on the left side)

1.5.4 Connector space for the side band, power lines and spares will also be provided. *******These lines are defined in the connector signal table at the end of this document.

1.6 SIO Chip 1.6.1 The SIO chip uses the following of its functions:
- The APIC Bus
- IRQs 3,4,5,6,9,10,11,12
- The PCI Arbiter
- The PCI Bus 1.6.3 The four interrupt lines from each I/O Canister card (1 per PCI slot) will be routed to one of the two SIO chips on the Back Plane. Each SIO Chip will be used as an interrupt controller for one of the PCI busses and be connected to the Mother Board APIC bus.

****For Back Plane PCI Bus 2 (OPB#1)
SIO#1 IRQ3 = Canister 0, PCI board 1
SIO#1 IRQ4 = Canister 0, PCI board 2
SIO#1 IRQ5 = Canister 0, PCI board 3
SIO#1 IRQ6 = Canister 0, PCI board 4
SIO#1 IRQ9 = Canister 1, PCI board 1
SIO#1 IRQ10 = Canister 1, PCI board 2
SIO#1 IRQ11 = Canister 1, PCI board 3
SIO#1 IRQ12 = Canister 1, PCI board 4

****For Back Plane PCI Bus 3 (OPB#2)
SIO#2 IRQ3 = Canister #2, PCI board 1
SIO#2 IRQ4 = Canister #2, PCI board 2
SIO#2 IRQ5 = Canister #2, PCI board 3
SIO#2 IRQ6 = Canister #2, PCI board 4
SIO#2 IRQ9 = Canister #3, PCI board 1
SIO#2 IRQ10 = Canister #3, PCI board 2

Raptor Hardware Spec.        4/19/96

Back Plane Board Specifications
Preliminary          Ver 0.08          NetFRAME Confidential SIO#2 IRQ11 = Canister #3, PCI board 3
         SIO#2 IRQ12 = Canister #3, PCI board 4

1.6.2   The eight (8) Interrupt lines from the 2 I/O Canister card are also "OR"ed together to produce an active low interrupt to the mother board SIO chip. (one per PCI bus :P2_INTZ, P3_INTZ) .

1.6.3   Each SIO chip is a PCI bus arbiter for one of the two PCI busses.
         ****For Back Plane PCI Bus 2 (OPB#1)
         REQ0/GNT0 = OPB #1
         REQ1/GNT1 = Bridge #1 Canister Address 0
         REQ2/GNT2 = Bridge #2 Canister Address 1
         REQ3/GNT3 = Not used
         REQ4/GNT4 = Not used
         ****For Back Plane PCI Bus 3 (OPB#2)
         REQ0/GNT0 = OPB #2
         REQ1/GNT1 = Bridge #1 Canister Address 2
         REQ2/GNT2 = Bridge #2 Canister Address 3
         REQ3/GNT3 = Not used
         REQ4/GNT4 = Not used 1.6.4   The Memory control lines from the OPBs are connected to the SIO (FlashReq, MemReq and MemAck)

1.6.5   The SIO chip does not use the following:
- The ISA Bus
- IRQs 1,2,7,8,13,14,15
- The Built in PCI Interrupts 1.6.6   All unused inputs and I/O pins are pulled to a non intrusive state.

1.7 Chassis Manager (CDM)

1.7.1   There will be two PIC Chips (1-PIC16C74 and 1-PIC16C65) on the backplane handling the following functions:
- monitor Canister SN/Present lines that are used to determine which of the Canister slots are filled and what is the serial number of that canister.
- monitor and control the system Power
  – Power Supply SN/Present
  – Power Supply On/Off
- monitor the DC voltage levels
- monitor the temperature at points around the system
- read and write system messages to Non Volatile RAM ("Flight Data Recorder"

NOTE:    PIC chips are to be powered from an independent BIAS +5v coming from the Power Supply.

Raptor Hardware Spec.          4/19/96

Back Plane Board Specifications
Preliminary   Ver 0.08   netFRAME Confidential

2.0 Raptor Extended Back Plane (Proposed)

2.1 Main Board Features
- Connectors for 1 Mother Bd (2-32 bit PCI connectors & side band signals & Power)
- Connectors for 3 Hot Swappable Power Supplies
- Eight (8) PCI to PCI Bridge chips
- Two SIO chips connected to the APIC bus and PCI busses
- Connectors for eight (8) I/O Canister Bds (-each includes- 1-32 bit PCI connectors & side band signals & Power)
- Chassis Controller circuitry using CDM Network Chips
- Chassis Controller circuitry using CDM/Wire Service Network Chips
- Test Connectors to bring out certain debugging signals- Two SIO chips connected to the APIC bus and PCI busses to handle PCI arbitration and interrupts
- Test Connectors to bring out certain debugging signals NOTE: All the PCB connectors on the Extended Back Plane are to be FEMALE pin connectors.

2.2 Mother Board Connectors
2.2.1 The Mother Board drives two separate PCI busses. These two are 32 bit PCI busses.
2.2.2 Connector space for the side band, power lines and spares is also provided. *******These lines are defined in the connector signal table at the end of this document.

2.3 Back Plane PCI Busses
2.3.1 The Back Plane contains two (2) independant PCI busses (PCI Bus #2 and PCI Bus #3)
2.3.2 Each PCI bus consists of one (1) OPB chip on the Mother Board, one (1) SIO chip on the Back Plane, and four (4) DEC PCI to PCI bridge chips on the Back Plane.
2.3.3 Each PCI bus has the same numbering scheme for devices connected to it.
- OPB IDSEL = 0 (on Mother Board)
- SIO IDSEL = 1
**** Bridge chips are numbered from the top down
- 1st Bridge Chip IDSEL = 2
- 2nd Bridge Chip IDSEL = 3
- 3rd Bridge Chip IDSEL = 4
- 4th Bridge Chip IDSEL = 5

2.3.4 Each OPB on the Mother Board outputs a PCI Clock. The two PCI Clocks that go to the Back Plane PCI Busses are buffered and distributed.

Back Plane Board Specifications

Preliminary  Ver 0.08  FRAME Confidential

2.4 PCI to PCI Bridge Chips
2.4.1 The Back Plane Board has eight (8) DEC 21152 Bridge chips on it. The Primary side of the chips is connected to one of the two PCI busses running from the Mother Board OPB chips. (4 chips on PCI #2 and 4 chips on PCI #3)

2.4.2 The secondary side of the bridge chips is connected to one of the eight canister board connectors

2.5 PCI Canister Board Connectors
2.5.1 Each of the 8 PCI Canister Board Connectors contains a single 32 bit PCI bus.

2.5.2 Hot inserting of these boards is desirable. By controlling FETs on the Canister boards with a CDM chip, this is accomplished by turning on the power to each PCI slot in sequence.

2.5.3 Each of the two PCI busses goes to only 4 of the 8 PCI Canister Board slots. Each PCI bus connects to each PCI Canister Board slot on one side of the Back Plane. (the 4 slots on the right side or the 4 slots on the left side)

2.5.4 Connector space for the side band, power lines and spares will also be provided. ********These lines are defined in the connector signal table at the end of this document.

2.6 SIO Chip
2.6.1 The SIO chip uses the following of its functions:
 - The APIC Bus
 - IRQs 3,4,5,6,9,10,11,12
 - The PCI Arbiter
 - The PCI Bus 2.6.3 The four Interrupt lines from each I/O Canister card (1 per PCI slot) will be routed to one of the two SIO chips on the Back Plane. Each SIO Chip will be used as an interrupt controller for one of the PCI busses and be connected to the Mother Board APIC bus. The 16 interupts on each PCI Bus will be wire ORed to get only 8 interupts going to the SIO chip.

****For Back Plane PCI Bus 2 (OPB#1)
SIO#1 IRQ3 = Canister #0, PCI board 1 & Canister #4, PCI board 1
SIO#1 IRQ4 = Canister #0, PCI board 2 & Canister #4, PCI board 2
SIO#1 IRQ5 = Canister #0, PCI board 3 & Canister #4, PCI board 3
SIO#1 IRQ6 = Canister #0, PCI board 4 & Canister #4, PCI board 4
SIO#1 IRQ9 = Canister #1, PCI board 1 & Canister #5, PCI board 1
SIO#1 IRQ10 = Canister #1, PCI board 2 & Canister #5, PCI board 2
SIO#1 IRQ11 = Canister #1, PCI board 3 & Canister #5, PCI board 3
SIO#1 IRQ12 = Canister #1, PCI board 4 & Canister #5, PCI board 4

Backplane Board Specifications
Preliminary      Ver 0.08      RAME Confidential

****For Back Plane PCI Bus 3 (OPB#2)
    SIO#2 IRQ3 = Canister #2, PCI board 1 & Canister #6, PCI board 1
    SIO#2 IRQ4 = Canister #2, PCI board 2 & Canister #6, PCI board 2
    SIO#2 IRQ5 = Canister #2, PCI board 3 & Canister #6, PCI board 3
    SIO#2 IRQ6 = Canister #2, PCI board 4 & Canister #6, PCI board 4
    SIO#2 IRQ9 = Canister #3, PCI board 1 & Canister #7, PCI board 1
    SIO#2 IRQ10 = Canister #3, PCI board 2 & Canister #7, PCI board 2
    SIO#2 IRQ11 = Canister #3, PCI board 3 & Canister #7, PCI board 3
    SIO#2 IRQ12 = Canister #3, PCI board 4 & Canister #7, PCI board 4

2.6.2   The sixteen (16) Interrupt lines from the 2 I/O Canister card are also "OR"ed together to produce an active low interrupt to the mother board SIO chip. (one per PCI bus :P2_INTZ, P3_INTZ) .

2.6.3   Each SIO chip is a PCI bus arbiter for one of the two PCI busses.
    ****For Back Plane PCI Bus 2 (OPB#1)
    REQ0/GNT0 = OPB #1
    REQ1/GNT1 = Bridge #1 Canister Address 0
    REQ2/GNT2 = Bridge #2 Canister Address 1
    REQ3/GNT3 = Bridge #3 Canister Address 4
    REQ4/GNT4 = Bridge #4 Canister Address 5
    ****For Back Plane PCI Bus 3 (OPB#2)
    REQ0/GNT0 = OPB #2
    REQ1/GNT1 = Bridge #1 Canister Address 2
    REQ2/GNT2 = Bridge #2 Canister Address 3
    REQ3/GNT3 = Bridge #1 Canister Address 6
    REQ4/GNT4 = Bridge #1 Canister Address 7

2.6.4   The Memory control lines from the OPBs are connected to the SIO (FlashReq, MemReq and MemAck)

2.6.5   The SIO chip does not use the following:
- The ISA Bus
- IRQs 1,2,7,8,13,14,15
- The Built in PCI Interrupts 2.6.6   All unused inputs and I/O pins are pulled to a non intrusive state.

2.7 Chassis Manager (CDM)

2.7.1   There will be two PIC Chips (1-PIC16C74 and 1-PIC16C65) on the backplane handling the following functions:
- monitor Canister SN/Present lines that are used to determine which of the Canister slots are filled and what is the serial number of that canister.
- monitor and control the system Power
  – Power Supply SN/Present
  – Power Supply On/Off
- monitor the DC voltage levels
- monitor the temperature at points around the system

Backplane Board Specifications
Ver 0.08

Preliminary · FRAME Confidential

- read and write system messages to Non Volatile RAM ("Flight Data Recorder"

NOTE: PIC chips are to be powered from an independent BIAS +5v coming from the Power Supply.

Raptor Hardware Spec. · 4/19/96

Backplane Board Specifications
Preliminary  Ver 0.08  NeuRAME Confidential

3.0 CONNECTOR SIGNAL TABLE

3.1 PCI/Sideband/Clock Connector Lines — Pin Count
3.1.1 Mother Board PCI/Sidebands/CLKs (2 segments=360 pins)

| Signal Name | Pin Count | NOTES |
|---|---|---|
| JTAG () | 4 | TDO,TDI,Trst,TCK |
| JTAG TMS | 1 | |
| CDM Bus | 2 | CDM_SDA, CDM_SCL |
| Temperature Sensor Bus | 4 | TMP_SDA, TMP_SCL |
| APIC CLK | 1 | |
| APIC BUS DATA | 2 | Apic D0 & D1 |
| Power Switch | 1 | |
| AC Power Supply DC OK | 1 | |
| | 0 | |
| PCI CLK in | 2 | One per PCI Bus |
| PCI CLK out | 2 | One per PCI Bus |
| PCI Data | 64 | 32 bits per PCI Bus |
| PCI CBEz | 8 | 4 bits per PCI Bus |
| PCI Control | 20 | 10 bits per PCI Bus |
| PCI REQ/GNT | 4 | 2 bits per PCI Bus |
| Interrupts | 2 | 1 bit per PCI Bus |
| SIO Memory Control lines | 6 | 3 bits per PCI Bus |
| | 0 | |
| VCC5 | 24 | |
| Vcc3.3 | 26 | |
| VCC12p | 4 | |
| VDD12n | 2 | |
| GND | 165 | |
| CDM Power | 2 | Bias +5v |
| | 0 | |
| Spares | 13 | |
| | 0 | |
| TOTAL PINS Required | 360 | |

Raptor Hardware Spec.  Page 8 of 10  4/19/96

Backplane Board Specifications

Preliminary  Ver 0.08  RAME Confidential

3.1.2 Canister Board Sidebands + CLKs + Spares (1 segment=180 pins)

| Signal Name | Pin Count | NOTES |
|---|---|---|
| JTAG () | 4 | TDO,TDI,Trst,TCK |
| JTAG TMS | 1 | |
| CDM Bus | 2 | CDM_SDA, CDM_SCL |
| Canister PRESENT | 1 | |
| Canister Address | 3 | 0-4 small BP; 0-8 large BP |
| | 0 | |
| PCI CLK | 4 | 1 bit per card slot |
| PCI Data | 32 | 32 bits per PCI Bus |
| PCI CBEz | 4 | 4 bits per PCI Bus |
| PCI Control | 10 | 10 bits per PCI Bus |
| PCI Card Interrupts | 4 | 1 bit per card slot |
| PCI REQ/GNT | 8 | 2 bits per card slot |
| | 0 | |
| VCC5 | 18 | |
| VCC12p | 3 | |
| VDD12n | 1 | |
| GND | 82 | |
| Bridge 5/3.3 select | 1 | S_VIO to the bridge chip |
| | 0 | |
| Spares | 2 | |
| | 0 | |
| TOTAL Pins | 180 | |

Raptor Hardware Spec.  4/19/96

Backplane Board Specifications
Preliminary   Ver 0.08   Neu RAME Confidential
4.0 Diagrams
Basic Backplane
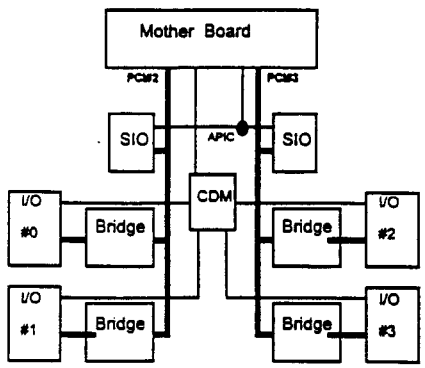
Extended Backplane
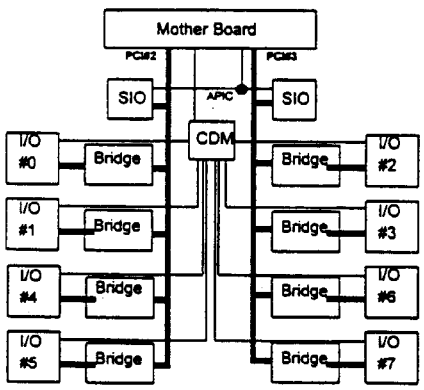

Raptor Hardware Specification	Rev 0.9	5/6/97

Mother Board SIO and Peripheral Logic (SPL)

Introduction

This document defines the next generation NetFRAME machine's SIO and Peripheral Logic (SPL) located on the Mother Board (MB). In order to allow the next generation machine to run off the shelf OSs, the machine will include standard PC Peripherals and Ports. This will allow this machine to even boot DOS from a Floppy.

PCI Bus 1 from the MB will be used exclusively by the SPL. An Adaptec SCSI Controller chip will be attached to the PCI Bus to create a SCSI interface for the optional CD-ROMs and optional Hard Disks. A Cirrus Logic SVGA Video Controller chip also will attach to the PCI Bus.

An ISA Bus will be created by an Intel System I/O-APIC (SIO.A - 82379AB) chip on the SPL. This chip is a PCI to ISA Bridge chip and also contains a PCI Bus Arbiter, an Interrupt Controller and a Speaker Driver. The SMC Super I/O chip will be attached to this ISA Bus to create a Floppy Disk interface, two Serial interfaces and a Parallel interface. An Intel 82C42 chip will also attach to the ISA Bus and will create the PS2 style Keyboard and PS2 style Mouse interfaces. The Dallas Real Time Clock (RTC) will attach to the ISA Bus. The Intel BIOS Flash Memory will attach to the ISA Bus.

The SPL will connect to the Wire Service (WS) Bus with a PIC16C65 chip manufactured by Microchip and two 1Kx9 FIFOs connected to the ISA Bus. The SPL will also contain other miscellaneous logic.

SCSI (CD-ROM & Hard Disks) Port

The SCSI Port is generated by an Adaptec AIC-7870 PCI Fast Wide SCSI-2 Controller chip and is used for optional CD-ROMs and optional Hard Disks. The CD-ROMs and Hard Disks will mount outside of the main chassis. BIOS can boot either through the MB SCSI Port or a SCSI Port created by a PCI SCSI card plugged into an I/O Canister. The SCSI Port 68-pin connector is on the MB EMI shield in the front of the machine.

Floppy Disk Port

The Floppy Disk Port from the SMC FDC37C665GT Super I/O chip is used by the 3.5" 1.44MB Floppy Disk which mounts onto the MB (with a very short signal ribbon cable and power cable. The TEAC FD-235HF-7240 Floppy Disk will be used.

Parallel Port

The Parallel Port from the SMC FDC37C665GT Super I/O chip allows one or more Parallel devices (Printer, Debugger, ...) to plug into the system. The Parallel Port Tin-plated Dimpled Sub-D connector is on the MB EMI shield in the front of the machine and uses a standard Female DB25 connector.

Serial Ports

The two Serial Ports from the SMC FDC37C665GT Super I/O chip allows two Serial devices (Modem, Debugger, UPS, ...) to plug into the system. The Serial Port Tin-plated Dimpled Sub-D connectors are on the MB EMI shield in the front of the machine and use standard Male DB9 connectors. Two Linear Technology LT1133s will drive the signals to/from RS-232 levels. One Serial Port will probably be used by the UPS.

Raptor Hardware Specification  Rev 0.9  5/6/97

WS Bus

The SIO.A chip ISA Bus connects to the WS PIC16C65 chip manufactured by Microchip used to create the WS Bus and two 1Kx9 FIFOs. The ISA Bus is used to allow the P6s to communicate on the WS Bus.

WS Bus External Port

The Philips 82B715 I2C Bus Extender chip will create the WS External Port to talk with the outside world for remote operations. The WS External Port connector is on the MB EMI shield in the front of the machine and uses a standard RJ45 8-pin connector.

Mouse Port

The Mouse Port from the Intel 82C42 chip uses a PS2 style Mini DIN connector. The Mouse Port is on the MB EMI shield in the front of the machine.

Keyboard Port

The Keyboard Port from the Intel 82C42 chip uses a PS2 style Mini DIN connector. The Gated A20 logic is also implemented along with the Port 92 logic. The Keyboard Port is on the MB EMI shield in the front of the machine.

Video Port

The Video Port from the Cirrus Logic CL-5436 chip allows one SVGA Monitor to plug into the system with a standard SVGA/DB15 connector. The Video controller chip will hang off the PCI Bus and will support 1024x768 mode with 256 colors. 1MB of Video RAM (DRAM) will be included in the system. This is NOT upgradeable. The Video Port is on the MB EMI shield in the front of the machine.

RTC

The RTC will be implemented using a Dallas DS12887A part which will hang off of the ISA Bus. This part has a 10 year minimum life.

Flash/BIOS

The Intel PA28F400BXT120 Flash/BIOS will be 512KB accessed 512Kx8 with 128KB allocated for the BIOS located at 000E0000:000FFFFF, FFEE0000:FFEFFFFF and FFFE0000:FFFFFFFF and 384KB allocated for Extended BIOS located at FFF80000:FFFDFFFF and will hang off the ISA Bus. There will be a button (and LED) for "Upload FLASH Enable" which will be input to (output from) a MB WS chip. Writing the BIOS areas will be controlled by this WS chip with input from the Flash Upload button. There is no parity on BIOS memory since there is no parity on the ISA Bus so software should disable shadowing before writing, write, then do a read after write always to verify that the data is written correctly. Since the BIOS memory is implemented in FLASH, it should not be susceptible to alpha particles so it is less likely that the location will go bad some time after the data is written. After the data is written, it is OK to re-enable shadowing of BIOS Memory. The Flash chip may be socketed.

Interrupts

The Interrupts will be routed by the SIO chip on the MB and two SIO chips on the Back Plane (BP). The MB SIO chip will handle the interrupts from all the PC compatibility devices as well as bundled PCI Interrupt for each BP PCI Bus. All PCI Interrupts from the 8 PCI slots on each PCI bus will be Raptor Hardware Specification     Rev 0.9                         5/6/97
wired together and routed to t.  SPL. The 3-wire APIC Bus runs be   en the SIO chips and the P6s.
Here is a Diagram of the 3 PCI Busses in the system:

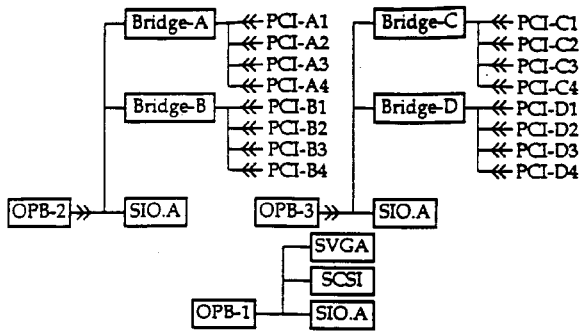

Here is a list of the PC Compatible IRQs and how they are allocated:

| IRQ | Use |
|---|---|
| 0 | Timer 1 Counter 0 (3 µsec) |
| 1 | PS2 Keyboard |
| 2 | Cascade from Slave |
| 3 | Com2 - Serial Port 2 |
| 4 | Com1 - Serial Port 1 |
| 5 | LPT1 - Parallel Port (alternate) |
| 6 | Floppy Disk |
| 7 | LPT1 - Parallel Port |
| 8 | RTC |
| 9 | PCI SVGA Video |
| 10 | PCI Bus 2 |
| 11 | PCI Bus 3 |
| 12 | PS2 Mouse |
| 13 | FERRz from P6 Coprocessors |
| 14 | PCI SCSI |
| 15 | WS |

It is under BIOS control how the PCI Bus Interrupts are routed. The PCI Bus Interrupts can either be routed to the MB SIO chip on IRQ 10 & 11 or routed to the BP SIO chips on IRQs 3, 4, 5, 6, 9, 10, 11 & 12.

PCI interrupts must be programmed Level sensitive, not Edge sensitive. This is because several PCI devices can present interrupts at the same time on the same line. Once one interrupt is sensed and serviced, that interrupt will be cleared. If there is another device on that line then the interrupt line will stay active until all interrupts on that line are serviced and cleared.

Speaker Port

The Speaker Port is created by the Intel SIO.A chip and allows a speaker to be attached to the system. The speaker attaches to the CPU Chassis and plugs in to the MB via a cable. The SIO.A chip Speaker Port has a maximum drive of 24mA.

LCD Screen

The LCD screen attaches to Front Bezel and plugs in to the MB via a cable. The LCD is driven by the PIC16C65 chip which is attached to the WS Bus.

Raptor Hardware Specification          Rev 0.9                                    5/6/97
Power ON and OFF Circuitry   set and NMI Buttons, LEDs

Along with the "Upload FLASH Enable" button, there are several other buttons. The Power On/Off button goes to the Back Plane. The NMI and Reset buttons are ORed together with the NMI and Reset WS signals and the NMI and Reset signals from the SIO chip and Keyboard Controller. They are sent to the P6s. All the buttons attach to the MB along with the LEDs.

Besides the Upload Flash Enable LED(Green), there is the MB Status LED(Green/Amber), System Fault LED(Amber), System Temperature Fault LED(Amber) and the MB Fan Failed LED(Amber).

Signal Count

Here is a list of all the signals needed to implement the SPL that go out the Back Plane:

| Signal | Type | Count |
|---|---|---|
| PCI INTz A:B | In | 2 |
| APICCLK | In | 1 |
| APICD0:1 | Bi | 2 |
| WS CLK | In | 1 |
| WS DATA | Bi | 1 |
| WS 5Vdc | In | 1 |
| Switched 5V | In | 3 |
| Total | | 11 |

Raptor Hardware Specification    Rev 0.9

Component List

| Component | Manufacturer P/N | NetFRAME | Quantity | Unit Power | Total Power | Unit Cost | Total Cost |
|---|---|---|---|---|---|---|---|
| SIO.A | Intel S82379AB | 56-260018-01 | 1 | 2.5 | 2.5 | 32.50 | 32.50 |
| Super I/O | SMC FDC37C665GT | 56-260021-01 | 1 | 0.260 | .260 | 8.00 | 8.00 |
| Keyboard Controller | Intel 82C42 | 56-260020-01 | 1 | 1.5 | 1.5 | 11.65 | 11.65 |
| WS Support | Microchip PIC16C65 | 57-000026-01 | 3 | 1.0 | 3 | 5.25 | 15.75 |
| PIC16C65 4MHz Crystal | Ecliptec | 69-000031-01 | 3 | 0 | 0 | 1.00 | 3.00 |
| Socket for PIC16C65 | | 20-200033-04 | 3 | 0 | 0 | 1.87 | 5.61 |
| 1K 8-bit FIFO | TI SN74ACT7202 | 51-200001-01 | 2 | .3 | .6 | 2.30 | 4.60 |
| I2C Bus Extender | Philips P82B715TD | 56-250026-01 | 1 | 0.3 | .3 | 3.25 | 3.25 |
| PCI SCSI Controller | Adaptec AIC-7870 | 56-260023-01 | 1 | 1.2 | 1.2 | 45.00 | 45.00 |
| PCI SVGA Controller | Cirrus Logic CL-5436 | 56-260022-01 | 1 | 2 | 2 | 18.00 | 18.00 |
| 1MB Video DRAM | Micron 256Kx16 | 51-100006-01 | 2 | .825 | 1.65 | 16.75 | 33.50 |
| RTC | Dallas DS12887A | 56-260019-01 | 1 | .3 | .3 | 5.00 | 5.00 |
| Socket for RTC | | 20-200016-01 | 1 | 0 | 0 | .97 | .97 |
| 512K Flash | Intel PA28F400BXT120 | 52-000015-01 | 1 | .4 | .4 | 16.35 | 16.35 |
| Socket for Flash | Yamaichi IC179-44600-500 | | 1 | 0 | 0 | 5.89 | 5.89 |
| RS-232 Driver/Receiver | LT 1133A | | 2 | .4 | .8 | 2.20 | 4.40 |
| LCD | EDT | 66-000012-01 | 1 | .405 | .405 | 22.60 | 22.60 |
| LCD Cable | 14-pin cable+keyed connector | | 1 | 0 | 0 | 1.50 | 1.50 |
| LCD Connector | 14-pin Male keyed connector | | 1 | 0 | 0 | .79 | .79 |
| Speaker | Quam | 39-00????-?? | 1 | 3 | 3 | 2.39 | 2.39 |
| Speaker Cable | 2-pin cable+keyed connector | | 1 | 0 | 0 | .78 | .78 |
| Speaker Connector | 2-pin Male keyed connector | | 1 | 0 | 0 | .23 | .23 |
| Power On/Off Button | | | 1 | 0 | 0 | .53 | .53 |
| Pin Hole Button | | 23-000015-01 | 3 | 0 | 0 | .84 | 2.52 |
| Green/Yellow LED | | 66-000011-01 | 1 | .05 | .05 | 1.13 | 1.13 |
| Yellow LED | | | 3 | .05 | .15 | .71 | 2.13 |
| Green LED | | | 1 | .05 | .05 | .71 | .71 |
| Floppy Disk | TEAC FD-235 | | 1 | 2.1 | 3 | 25.00 | 25.00 |
| FD Signal Cable | 34-pin cable+keyed connector | | 1 | 0 | 0 | 2.77 | 2.77 |
| FD Power Cable | 4-pin Mini Molex | | 1 | 0 | 0 | 1.23 | 1.23 |
| Keyboard | | | 0 | .75 | .75 | 25.00 | 0 |
| Mouse | | | 0 | .5 | .5 | 15.00 | 0 |
| 68-pin SCSI Connector | AMP | 20-110071-01 | 1 | 0 | 0 | 4.23 | 4.23 |
| SCSI Cable | | | 0 | 0 | 0 | 77.00 | 0 |
| WS RJ45 Connector | | | 1 | 0 | 0 | 1.22 | 1.22 |
| Mini DIN Connector | AMP | 20-400062-01 | 2 | 0 | 0 | 1.95 | 3.90 |
| DB9 Connector | AMP | 20-100049-01 | 2 | 0 | 0 | 4.20 | 8.40 |
| Serial Cable | | | 0 | 0 | 0 | 6.00 | 0 |
| DB25 Connector | ITT Cannon | 20-110069-01 | 1 | 0 | 0 | 1.83 | 1.83 |
| Parallel Cable | | | 0 | 0 | 0 | 6.00 | 0 |
| SVGA DB15 Connector | ITT Cannon | 20-110068-01 | 1 | 0 | 0 | 1.60 | 1.60 |
| SVGA Video Cable | | | 0 | 0 | 0 | 13.00 | 0 |
| SVGA Monitor | | | 0 | 0 | 0 | 300.00 | 0 |
| Total Power & Cost | | | | | 22.415 | | 298.96 |

What is claimed is:

1. In a computer system having a first, second, and third bus, a method comprising:
   connecting a first first-to-second bridge to the first bus;
   connecting a second first-to-second bridge to the first bus;
   connecting a first set of second-to-third bridges to the first first-to-second bridge via the second bus;
   connecting a second set of second-to-third bridges, that are redundant to the first set of second-to-third bridges, to the second first-to-second bridge via the third bus; and
   adding a plurality of board connectors redundantly to each of the first and second sets of second-to-third bridges via a plurality of respective buses.

2. The method as defined in claim 1, wherein the act of connecting the first bus includes the act of connecting to a local processor bus.

3. The method as defined in claim 1, wherein the act of connecting via each of the second and third buses includes the act of connecting via a peripheral component interconnect (PCI) bus.

4. The method as defined in claim 1, wherein the act of adding via each of the plurality of respective buses includes the act of adding via a peripheral component interconnect (PCI) bus.

5. The method as defined in claim 1, wherein the act of connecting each of the first and second first-to-second bridges includes the act of connecting a processor-to-PCI bridge.

6. The method as defined in claim 1, wherein the act of connecting each of the second-to-third bridges includes connecting a PCI-to-PCI bridge.

7. The method as defined in claim 1, wherein the act of connecting first set of second-to-third bridges includes connecting four second-to-third bridges.

8. The method as defined in claim 1, wherein the act of connecting second set of second-to-third bridges includes the act of connecting four second-to-third bridges.

9. The method as defined in claim 1, wherein the act of adding the plurality of board connectors includes the act of adding sixteen board connectors.

10. The method as defined in claim 1, wherein the act of adding via each of the plurality of respective buses includes the act of adding via a peripheral component interconnect (PCI) bus.

11. The method as defined in claim 1, wherein the act of adding via each of the plurality of respective buses includes the act of generating each of the plurality of respective buses by a single second-to-third bridge.

12. A program storage device storing instructions that when executed by a computer, having a first, second, and third bus, perform a method comprising:
    communicating between a first first-to-second bridge and the first bus;
    communicating between a second first-to-second bridge and the first bus;
    communicating between a first set of second-to-third bridges and the first first-to-second bridge via the second bus;
    communicating between a second set of second-to-third bridges, that are redundant to the first set of second-to-third bridges, and the second first-to-second bridge via the third bus; and
    communicating between a plurality of board connectors and each of the first and second sets of second-to-third bridges via a plurality of respective buses, wherein the plurality of board connectors are redundantly connected to the first and second sets of second-to-third bridges.

13. The device as defined in claim 12, wherein the first bus is a local processor bus.

14. The device as defined in claim 12, wherein each of the second and third buses is a peripheral component interconnect (PCI) bus.

15. The device as defined in claim 12, wherein each of the plurality of respective buses is a peripheral component interconnect (PCI) bus.

16. The device as defined in claim 12, wherein each of the first and second first-to-second bridges is a processor-to-PCI bridge.

17. The device as defined in claim 12, wherein each of the second-to-third bridges is a PCI-to-PCI bridge.

18. In a computer system having a first, second, and third bus, a method comprising:
    connecting a first bus-to-bus bridge to the first bus to generate the second bus;
    connecting a first plurality of bus-to-bus bridges to the second bus;
    connecting a second bus-to-bus bridge to the first bus to generate the third bus; and
    connecting a second plurality of bus-to-bus bridges to the third bus, wherein the first bus-to-bus bridge and the first plurality of bus-to-bus bridges are redundant to the second bus-to-bus bridge and the second plurality of bus-to-bus bridges.

19. The method as defined in claim 18, wherein the act of connecting the first bus-to-bus bridge and second bus-to-bus bridge includes supporting fault-tolerance functionality.

20. The method as defined in claim 18, wherein the act of connecting the first bus-to-bus bridge fails, the act of connecting the second bus-to-bus bridge remains to maintain connectivity between the first bus and the third bus.

21. The method as defined in claim 18, wherein the act of connecting one of the first plurality of bus-to-bus bridges includes adding a first board, and the act of connecting one of the second plurality of bus-to-bus bridges includes adding a second board.

22. The method as defined in claim 21, wherein the act of adding the first board includes the act of adding a substantially similar second board.

23. The method as defined in claim 21, wherein the acts of adding the first board and second board include the act of connecting the first board and second board to a common device.

24. In a computer system having a processor bus, a first PCI bus, and a second PCI bus, a method comprising:
    connecting a first processor-PCI bridge to the processor bus;
    connecting a second processor-PCI bridge to the processor bus;
    connecting a first set of four PCI-PCI bridges to the first processor-PCI bridge via the first PCI bus;
    connecting a second set of four PCI-PCI bridges to the second processor-PCI bridge via the second PCI bus such that said second set of four PCI-PCI bridges are redundant to the first set of four PCI-PCI bridges; and
    redundantly connecting a plurality of board connectors to each of the first and second sets of PCI-PCI bridges via a plurality of respective PCI buses.

25. The method as defined in claim 24, wherein the act of connecting the plurality of board connectors includes the act of connecting sixteen board connectors.

26. The method as defined in claim 24, wherein the act of connecting via the plurality of respective PCI buses includes the act of connecting via four PCI buses.

27. The method as defined in claim 1, further comprising:

connecting a first-to-fourth bidirectional bridge to the first bus;

connecting a plurality of fourth-to-fifth bi-directional bridges to the first-to-fourth bidirectional bridge via a fourth bus; and adding a plurality of board connectors to the plurality of fourth-to-fifth bi-directional bridges via a plurality of fifth buses.

28. The method as defined in claim 27, wherein the plurality of third buses are symmetric to the plurality of fifth buses.

29. The device as defined in claim 21, further comprising:

communicating between a first-to-fourth bi-directional bridge and the first bus;

communicating between a plurality of fourth-to-fifth bi-directional bridges and the first-to-fourth bi-directional bridge via a fourth bus; and communicating between a plurality of board connectors and the plurality of fourth-to-fifth bidirectional bridges via a plurality of fifth buses.

30. The method as defined in claim 29, wherein the plurality of third buses are symmetric to the plurality of fifth buses.

* * * * *